US012292310B2

(12) United States Patent
Salman et al.

(10) Patent No.: US 12,292,310 B2
(45) Date of Patent: May 6, 2025

(54) MACHINE LEARNING BASED METHANE EMISSIONS MONITORING

(71) Applicant: Schlumberger Technology Corporation, Sugar Land, TX (US)

(72) Inventors: Nader Salman, Tomball, TX (US); Lukasz Zielinski, Arlington, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 18/537,978

(22) Filed: Dec. 13, 2023

(65) Prior Publication Data

US 2024/0200991 A1  Jun. 20, 2024

Related U.S. Application Data

(60) Provisional application No. 63/485,944, filed on Feb. 20, 2023, provisional application No. 63/433,004, filed on Dec. 15, 2022.

(51) Int. Cl.
*G01D 21/00* (2006.01)
*G06N 20/00* (2019.01)

(52) U.S. Cl.
CPC .............. *G01D 21/00* (2013.01); *G06N 20/00* (2019.01)

(58) Field of Classification Search
CPC ................................. G01D 21/00; G06N 20/00
See application file for complete search history.

(56) References Cited

U.S. PATENT DOCUMENTS

| 11,525,764 | B2  | 12/2022 | Bryning |
| 11,630,022 | B2  | 4/2023  | Hedberg |
| 11,731,747 | B2* | 8/2023  | Pomerantz .............. G01S 19/01 701/21 |
| 2014/0067919 | A1 | 3/2014 | Tada |
| 2015/0103178 | A1 | 4/2015 | Itoh |

(Continued)

FOREIGN PATENT DOCUMENTS

| CN | 109195132 A | 1/2019 |
| CN | 109614526 A | 4/2019 |

(Continued)

OTHER PUBLICATIONS

Majumder et al., "Development and Evaluation of Ensemble Learning-based Environmental Methane Detection and Intensity Prediction Models", Dec. 17, 2023, arXiv:2312. 10879v1, pp. 1-16 (Year: 2023).*

(Continued)

*Primary Examiner* — Mischita Henson
(74) *Attorney, Agent, or Firm* — Michael Guthrie; Jeffrey D. Frantz

(57) ABSTRACT

Machine learning based methane emissions monitoring includes collecting sensor data from sensors and applying an augmentation model to the sensor data to form a regression training set. A classification training set for a classification model is created by replacing regression output values from the regression training set with classification output values. The classification output values include binary values. Machine learning based methane emissions monitoring further includes training the regression model with the regression training set to generate a regression prediction and training the classification model with the classification training set to generate a classification prediction.

19 Claims, 12 Drawing Sheets

(56) References Cited

U.S. PATENT DOCUMENTS

| | | |
|---|---|---|
| 2015/0213697 A1 | 7/2015 | Knox |
| 2015/0369730 A1 | 12/2015 | Schmidt |
| 2016/0146696 A1 | 5/2016 | Steele |
| 2017/0024642 A1 | 1/2017 | Xiong |
| 2017/0364818 A1 | 12/2017 | Wu |
| 2018/0039885 A1 | 2/2018 | Albrecht |
| 2018/0292286 A1 | 10/2018 | Dittberner |
| 2018/0365522 A1 | 12/2018 | Jiang |
| 2019/0196892 A1* | 6/2019 | Matei .................. G06N 20/00 |
| 2019/0285504 A1 | 9/2019 | Muralidhar |
| 2019/0285600 A1 | 9/2019 | Klein |
| 2019/0302013 A1 | 10/2019 | Wang |
| 2020/0011789 A1 | 1/2020 | Sandsten |
| 2020/0176088 A1 | 6/2020 | Kanamarlapudi |
| 2020/0182779 A1 | 6/2020 | Kasten |
| 2020/0226426 A1* | 7/2020 | Jarquin Arroyo ..... G06F 18/217 |
| 2020/0393434 A1 | 12/2020 | Li |
| 2020/0398959 A1* | 12/2020 | Pomerantz ............ H04B 7/155 |
| 2021/0140934 A1 | 5/2021 | Smith |
| 2021/0156793 A1 | 5/2021 | Leen |
| 2021/0255157 A1 | 8/2021 | Rashid |
| 2022/0244127 A1 | 8/2022 | Aubrey |
| 2022/0327708 A1 | 10/2022 | Satish |
| 2023/0111401 A1 | 4/2023 | Machover |
| 2023/0175914 A1 | 6/2023 | Diven |
| 2023/0177726 A1 | 6/2023 | Spears |
| 2023/0194483 A1 | 6/2023 | Some |
| 2023/0222271 A1* | 7/2023 | Spackova ............... G06F 30/27 703/1 |
| 2023/0324430 A1 | 10/2023 | Reed |
| 2023/0326201 A1 | 10/2023 | Rashid |
| 2024/0257285 A1* | 8/2024 | Foiles .................... G01W 1/02 |

FOREIGN PATENT DOCUMENTS

| | | |
|---|---|---|
| CN | 113887044 A | 1/2022 |
| CN | 114329245 A | 4/2022 |
| CN | 114416692 A | 4/2022 |
| CN | 115018327 A | 9/2022 |
| CN | 115187767 A | 10/2022 |
| EP | 0943085 B1 | 3/2004 |
| JP | H06294500 A | 10/1994 |
| JP | H07083786 | 3/1995 |
| JP | H07140031 A | 6/1995 |
| JP | H07190879 A | 7/1995 |
| JP | H07198523 A | 8/1995 |
| JP | 2996349 B2 | 10/1999 |
| KR | 101473956 B1 | 12/2014 |
| KR | 2015003470 A | 1/2015 |
| KR | 20160123467 A | 10/2016 |
| KR | 20180041828 A | 4/2018 |
| KR | 20190058230 A | 5/2019 |
| WO | 2019213280 A1 | 11/2019 |
| WO | WO-2020018867 A1 * | 1/2020 ............ B64D 47/00 |
| WO | 2020206008 A1 | 10/2020 |
| WO | 2020263693 A1 | 12/2020 |
| WO | 2021067844 A1 | 4/2021 |
| WO | 2021156864 A1 | 8/2021 |
| WO | 2022023226 A1 | 2/2022 |
| WO | 2022051572 A1 | 3/2022 |
| WO | 2022056152 A1 | 3/2022 |
| WO | 2023108041 A1 | 6/2023 |
| WO | 2023133345 A1 | 7/2023 |
| WO | 2024030523 A1 | 2/2024 |
| WO | 2024030525 A1 | 2/2024 |
| WO | 2024054640 A1 | 3/2024 |
| WO | 2024064113 A1 | 3/2024 |
| WO | 2024155857 A1 | 7/2024 |

OTHER PUBLICATIONS

Andrews et al., "Quantitative Mapping of Methane Emissions in Oil & Gas Facilities", Oct. 16-18, 2023, Society of Petroleum Engineers, SPE-214909-MS, https://dx.doi.org/10.2118/214909-MS, pp. 1-10 (Year: 2023).*

Imbiriba et al., "Augmented physics-based machine learning for navigation and tracking", 2023, IEEE Transactions on Aerospace and Electronic Systems, pp. 1-13 (Year: 2023).*

Chakrabarti et al., "Rapid Detection of Methane Super-Emitters Through Advanced Interpretation", Oct. 31-Nov. 3, 2022, Society of Petroleum Engineers, SPE-210970-MS, DOI 10.2118/210970-MS, pp. 1-6 (Year: 2022).*

Silberstein et al., Utilization of a Low-Cost Sensor Array for Mobile Methane Monitoring, 2024, Sensors, 24(2), 519, pp. 1-13 https://doi.org/10.3390/s24020519 (Year: 2024).*

Combined Search and Exam Report issued in United Kingdom patent Application No. GB2409015.1 dated Oct. 8, 2024, 5 pages.

International Search Report and Written Opinion issued in the PCT Application No. PCT/US2024/033102 dated Sep. 24, 2024, 10 pages.

Titchener et al. "Single photon Lidar gas imagers for practical and widespread continuous methane monitoring." Applied Energy 306 (2022): 118086. (11 pages).

Saunois, M., et al. (2020), The Global Methane Budget 2000-2017, Earth Syst. Sci. Data, 12, 1561-1623.

Pomerantz A.E. et al., 2022. Present global warming: a justifiable and stable metric for evaluating short-lived climate pollutants. Environmental Research Letters, 17(11), p. 114052. (6 pages).

Cusworth, D.H. et al., 2021. Intermittency of large methane emitters in the Permian Basin. Environmental Science Technology Letters, 8(7), pp. 567-573.

Chakrabarti et al., 2022, September. Rapid Detection of Super-Emitters Utilizing an IoT-Enabled Continuous Methane Emissions Monitoring System. In SPE Annual Technical Conference and Exhibition. OnePetro. (6 pages).

Chakrabarti et al., Oct. 2022, Rapid Detection of Methane Super-Emitters Through Advanced Interpretation. In ADIPEC. OnePetro (6 pages).

Potyrailo, R.A. et al., 2020. Extraordinary performance of semi-conducting metal oxide gas sensors using dielectric excitation. Nature Electronics, 3(5), pp. 280-289.

Zimmerle, D. Metec Controlled Test Protocol: Continuous Monitoring Emission Detection And Quantification, Energy Institute, Colorado State University. https://energy.colostate.edu/wp-content/uploads/sites/28/2021/03/Continuous-Monitoring-Protocol-R1.0.pdf (31 pages).

Take control of your emissions management programme, downloaded on Dec. 15, 2023 from link https://sensorup.com/methane-emissions-management/ (12 pages).

BlueSky resources makes sense out of sensors, downloaded on Dec. 15, 2023 from linke https://blueskyresources.com/solutions/ (3 pages).

Yu, L. et al., "Methane leakage source location based on a near-infrared off-axis integrated cavity output spectroscopic ppbv-level sensor and an optimized inverse model", Infrared Physics Technology, 2022, vol. 121, pp. 1-9.

Weidmann, D. et al., "Locating and Quanitifying Methane Emissions by Inverse Analysis of Path-Integrated Concentation Data Using a Markov-Chain Monte Carlo Apporach", ACS Earth and Space Chemistry, 2022, 6(9), pp. 2190-2198.

Ye, W. et al., "Leakage source location based on Gaussain plume diffusion model using a near-infrared sensor", Infrared Physics Technology, 2020, vol. 109, pp. 1-5.

S. R. Hanna, G. A. Briggs, R. P. Hosker, 1982, Handbook on Atmospheric Diffusion, DOE/TIC-11223 (7 pages).

"AERMOD" downloaded from Wikipedia on Jul. 31, 2024 from [https://en.wikipedia.org/wiki/AERMOD], Last Edited Mar. 4, 2022, 2 pages.

Search Report issued in Norwegian U.S. Appl. No. 20/230,720 on Jan. 23, 2024; 10 pages.

Office Action issued in U.S. Appl. No. 18/480,279 dated Nov. 7, 2023, 13 pages.

International Search Report and Written Opinion issued in PCT Application PCT/US2023/083724, dated Apr. 30, 2024 (9 pages).

(56) References Cited

OTHER PUBLICATIONS

International Search Report and Written Opinion issued in PCT Application PCT/US2023/033106, dated Jan. 23, 2024 (7 pages).
International Search Report and Written Opinion issued in the PCT Application No. PCT/US2023/029361 dated Nov. 14, 2023, 11 pages.
International Search Report and Written Opinion issued in the PCT Application No. PCT/US2023/029363 dated Nov. 21, 2023, 10 pages.
International Search Report and Written Opinion issued in the PCT Application No. PCT/US2024/012087 dated May 23, 2024, 11 pages.
International Search Report and Written Opinion issued in PCT Application PCT/US2023/010475, dated May 2, 2023 (11 pages).
International Preliminary Report on Patentability issued in the PCT Application No. PCT/US2023/010475 dated Jul. 25, 2024, 8 pages.
International Search Report and Written Opinion issued in PCT Application PCT/US2023/032307, dated Dec. 26, 2023 (10 pages).
International Search Report and Written Opinion issued in PCT Application PCT/US2023/029361, dated Nov. 14, 2023 (11 pages).
International Search Report and Written Opinion issued in PCT Application PCT/US2023/029363, dated Nov. 21, 2023 (10 pages).
International Search Report and Written Opinion issued in the PCT Application No. PCT/US2023/032307 dated Dec. 26, 2023, 10 pages.
Notice of Allowance issued in U.S. Appl. No. 18/480,279 dated Nov. 8, 2024, 26 pages.
Extended Search Report issued in European Patent Application No. 24182656.9 dated Nov. 14, 2024, 6 pages.

\* cited by examiner

| timestamp | concentration_avg | concentration_stdev | solar_radiation_avg | solar_radiation_stdev | wspd_scalar_avg | wspd_scalar_stdev |
|---|---|---|---|---|---|---|
| 2022-06-04T17:48:59.000 | 0.8 | 0 | 689.5 | 19.1 | 4.81 | 0.64 |
| 2022-06-09T10:10:59.000 | 1.7 | 0 | 0 | 0 | 3.62 | 0.57 |
| 2022-06-09T11:41:59.000 | 2.1 | 0 | 2.8 | 0.1 | 2.78 | 0.5 |
| 2022-06-01T15:29:59.000 | 12.5 | 5.9 | 59.4 | 1 | 2.39 | 0.26 |
| 2022-06-05T04:01:59.000 | 1.4 | 0 | 0 | 0 | 2.61 | 0.34 |
| 2022-06-08T16:02:59.000 | 0.8 | 0 | 253.7 | 3.2 | 11.46 | 1.75 |
| 2022-06-09T11:41:59.000 | 1.9 | 0 | 2.8 | 0.1 | 2.78 | 0.5 |
| 2022-06-07T19:34:59.000 | 1.4 | 0 | 313.7 | 11.9 | 7.38 | 0.73 |
| 2022-06-01T06:31:59.000 | 1.9 | 0 | 0 | 0 | 6.31 | 0.67 |
| 2022-06-02T18:02:59.000 | 2 | 0 | 265.8 | 2.8 | 3.22 | 0.48 |

1002

| wspd_vector_avg | wdir_vector_avg | wdir_vector_stdev | wdir_sin_avg | wdir_cos_x | y | z |
|---|---|---|---|---|---|---|
| 4.79 | 74.3 | 5.09 | 0.95 | 0.26 | 0 | 1.8288 |
| 3.58 | 193.63 | 8.51 | -0.25 | -0.95 | 0 | 1.8288 |
| 2.76 | 168.88 | 6.22 | 0.19 | -0.97 | 50.2203 | 1.8288 |
| 2.37 | 179.8 | 6.95 | 0 | -0.99 | -0.5922 | 1.8288 |
| 2.6 | 111.97 | 5.4 | 0.92 | -0.37 | 11.0837 | 21.878 | 1.8288 |
| 11.41 | 202.11 | 5.77 | -0.37 | -0.92 | 11.0837 | 21.878 | 1.8288 |
| 2.76 | 168.88 | 6.22 | 0.19 | -0.97 | 0 | 1.8288 |
| 7.31 | 211.9 | 7.82 | -0.52 | -0.84 | 22.8823 | -25.332 | 1.8288 |
| 6.3 | 181.1 | 3.69 | -0.03 | -0.99 | 22.8823 | -25.332 | 1.8288 |
| 3.19 | 157.6 | 7.92 | 0.37 | -0.91 | 44.3628 | 14.0575 | 1.8288 |

MACHINE LEARNING BASED METHANE EMISSIONS MONITORING

CROSS REFERENCE TO RELATED APPLICATIONS

This application claims the benefit of U.S. Provisional Application 63/433,004, filed Dec. 15, 2022, which is incorporated herein by reference to the extent allowed by applicable rules and law. This application also claims the benefit of U.S. Provisional Application 63/485,944, filed Feb. 20, 2023, which is incorporated herein by reference to the extent allowed by applicable rules and law.

BACKGROUND

Next to carbon dioxide, methane (CH4) is a greenhouse gas of interest. Controlling fugitive methane is a priority for containing climate change. A cost-effective way to detect methane emissions is via permanent installations of low-cost methane sensors. Many such technologies exist, and many companies offer sensor packages for as little as a few hundred dollars. Irrespective of technology used, a challenge is the interpretation of the data output from the sensors (e.g., methane concentration in parts per million (ppm)) in relation to the quantity of interest (e.g., emission rate). Linking the sensor output to the quantity of interest may be challenging because the transport and dispersion of methane depend on the state of the atmospheric boundary layer, with turbulence at multiple length and time scales. This is an intractable problem in fluid mechanics as there is no deterministic model describing the motion of methane molecules. While some simplified models based on Gaussian plume model (GPM) dispersion do exist, the simplified models may be too simplistic and inaccurate. These complications lead to a lack of appropriate data to analyze and form models to predict the presence of emissions.

A challenge in quantification of pollutant emissions based on point sensor measurements is linking the concentrations measured at some place far away from the emission source to the actual emission rate and location. The dispersion of the pollutant particles or molecules follows the complex turbulent flow of air in the earth's atmospheric boundary layer. Simplified statistical models such as the Gaussian plume model (GPM) have been developed to capture the average behavior in steady wind but, outside of highly controlled wind tunnel experiments, such models may be inaccurate because the real atmosphere may not satisfy the assumptions in the model. Inversions based on GPM, or any other simplified physics models, suffer from these inaccuracies as well. Full numerical simulation of the complete Navier-Stokes equations, on the other hand, is intractable for any real full-size open-air facility.

SUMMARY

In general, in one or more aspects, the disclosure relates to a method implementing machine learning based methane emissions monitoring. The method includes collecting sensor data from a plurality of sensors. The method further includes applying an augmentation model to the sensor data to form a regression training set. The method further includes creating a classification training set for a classification model by replacing regression output values from the regression training set with classification output values. The classification output values include binary values. The method further includes training the regression model with the regression training set to generate a regression prediction. The method further includes training the classification model with the classification training set to generate a classification prediction.

Other aspects of the one or more embodiments may be apparent from the following description and the appended claims.

BRIEF DESCRIPTION OF DRAWINGS

FIG. 4, FIG. 5, FIG. 6, FIG. 7, FIG. 8, FIG. 9, FIG. 10, FIG. 11 show examples in accordance with one or more embodiments.

Similar elements in the various figures are denoted by similar names and reference numerals. The features and elements described in one figure may extend to similarly named features and elements in different figures.

DETAILED DESCRIPTION

Figure 1:
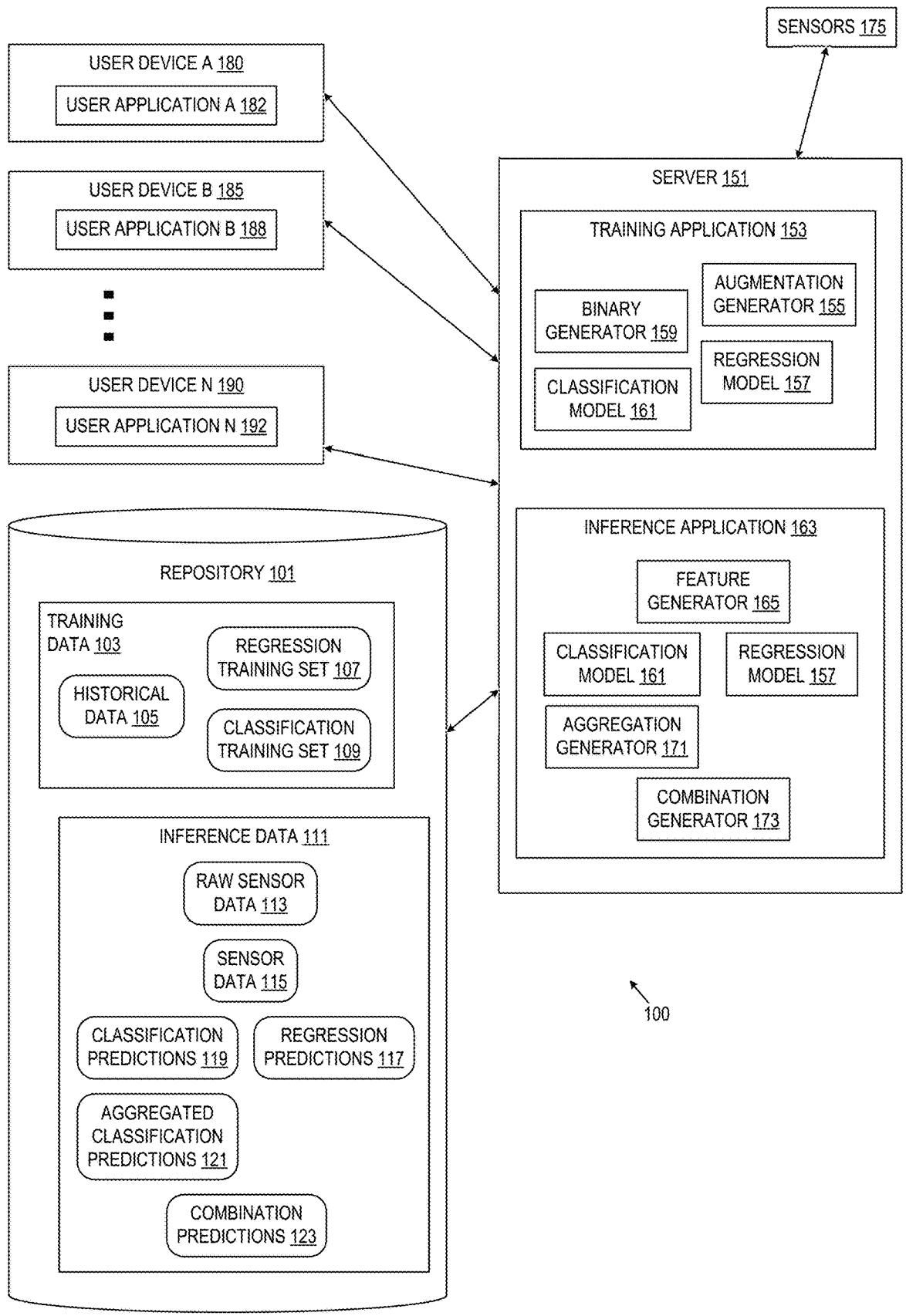
FIG. 1, FIG. 2A, and FIG. 2B show diagrams in accordance with one or more embodiments.

Embodiments of the disclosure implement machine learning based methane emissions monitoring. Systems and methods of the disclosure train a regression model and a classification model to generate predictions from sensor data to identify the presence of an emission. The challenge of the lack of appropriate data is addressed by augmenting the sensor data to form training data. The augmentation applies physics-based models to the original sensor data to expand the training data to include synthetic data. For example, the original sensor data may be captured for a given set of atmospheric conditions (e.g., wind speed and direction). The physics-based models may be applied to the original sensor data to synthesize augmented data for different atmospheric conditions (e.g., different wind speeds and directions). The training data, which is augmented from the original sensor data, is used to train the machine learning models.

The machine learning models include a regression model and a classification model. The regression model predicts the amount being emitted (e.g., unit volume per unit time) and the classification model predicts whether an emission is present. The two predictions from the regression model and from the classification model are combined to generate a prediction that identifies the presence and the amount of an emission. The stochastic nature of pollutant dispersion, underpinned by fundamental regularities, lends itself well to the application of machine learning (ML) techniques which have been used successfully to simulate and solve complex physics equations, achieving better performance than conventional simulators.

A challenge in quantification of pollutant emissions based on point sensor measurements is linking the concentrations measured at some place far away from the emission source to the actual emission rate and location. The dispersion of the pollutant particles or molecules follows the complex turbulent flow of air in the earth's atmospheric boundary layer. Simplified statistical models such as the Gaussian plume model (GPM) have been developed to capture the average behavior in steady wind but, outside of highly controlled wind tunnel experiments, such models may be inaccurate because the real atmosphere may not satisfy the assumptions in the model. Inversions based on GPM, or any other simplified physics models, suffer from these inaccuracies as well. Full numerical simulation of the complete Navier-Stokes equations, on the other hand, is intractable for any real full-size open-air facility. The stochastic nature of pollutant dispersion, underpinned by fundamental regularities, lends itself well to the application of machine learning (ML) techniques which have been used successfully to simulate and solve complex physics equations, achieving better performance than conventional simulators. A problem addressed by the disclosure is to create a model for a given facility and a given layout or configuration of sensors measuring the pollutant concentration, which may be, for example, a natural gas production facility or oil rig and methane (CH4) concentration sensing devices. The model outputs the emission rate and location based on the readings of the concentration sensors as well as the meteorological conditions sensors (e.g., anemometers and pyranometers).

Turning to FIG. 1, the system (100) is a computing system shown in accordance with one or more embodiments. The system (100) and corresponding components may utilize the computing systems described in FIG. 12A and FIG. 12B to develop programming language models for machine learning tasks. Different architectures may be used. The system (100) includes the repository (101), the server (151), the sensors (175), and the user devices A (180) and B (185) through N (190).

The sensors (175) capture the raw sensor data (113). In one embodiment, the sensors are placed at an installation to record the historical data (105). After training of the regression model (157) and the classification model (161), the sensors (175) may capture live data used to predict if a gas emission is present. The raw sensor data (113) may include values for wind speed, wind direction, solar radiation, humidity, temperature, pressure, etc., and may be stored in the repository (101).

The repository (101) is a type of storage unit and/or device (e.g., a file system, database, data structure, or any other storage mechanism) for storing data. The repository (101) may include multiple different, potentially heterogeneous, storage units and/or devices. The repository (101) stores data utilized by other components of the system (100). The data stored by the repository (101) includes the training data (103) and the inference data (111).

The training data (103) is data used by the system to train machine learning models, including the classification model (161) and the regression model (157). The training data (103) includes the historical data (105), the regression training set (107), and the classification training set (109).

The historical data (105) includes data captured by the system (100) to train the machine learning models. In one embodiment, the historical data (105) includes raw sensor data captured and recorded from the sensors (175). In one embodiment, the historical data (105) includes sensor data generated from filtering, flattening, and cleaning up raw sensor data from the sensors (175).

The regression training set (107) is data used to train the regression model (157). In one embodiment, the regression training set (107) includes the sensor data (115) and synthetic data. The sensor data (115) is captured by the sensors (175) from a facility. The synthetic data is generated by applying physics-based models to modified versions of the sensor data (115). For example, the sensor data (115) may include values for wind speed, wind direction, solar radiation, humidity, temperature, pressure, etc. One or more of these values from the sensor data (115) may be manipulated to form the synthetic input data. The physics-based model is applied to the synthetic input data to generate synthetic output data. The synthetic input data and the synthetic output data may be paired together to form the synthetic data.

In one embodiment, the regression training set (107) includes historical sensor data (in the historical data (105)). The regression training set (107) includes pairs of inputs and outputs. The inputs of the regression training set (107) include data from the sensors (175), e.g., wind speed, wind direction, sensor location, methane concentration, etc., which may be measured or augmented. The outputs within the regression training set (107) quantify the gas (e.g., methane) flow rate of an emission, which may be stored as rational numbers.

The classification training set (109) is data used to train the classification model (161). In one embodiment, the classification training set (109) may include a copy of the inputs from the regression training set (107) while the outputs are class based outputs. For example, the output may be a binary classification identifying whether a methane emission is present (e.g., "1" may represent an emission is present and "0" may represent that an emission is not present).

The inference data (111) is data generated by the system (100) during inference, e.g., during the usage of the regression model (157) and the classification model (161) to detect or predict methane emissions. The inference data (111) includes the raw sensor data (113), the sensor data (115), the regression predictions (117), the classification predictions (119), the aggregated classification predictions (121), and the combination predictions (123).

The raw sensor data (113) is data from the sensors (175). The raw sensor data (113) may include the values, features, columns, etc., of data generated by the sensors (175), which may be prefiltered. In one embodiment, the raw sensor data (113) includes values for methane concentration, solar radiation, wind speed, wind direction, etc.

The sensor data (115) is raw sensor data modified for entry to the regression model (157) and the classification model (161). The sensor data (115) may be modified from the raw sensor data (113) by cleaning up, flattening, filtering, etc., the raw sensor data (113).

The regression predictions (117) are the outputs from the regression model (157). The regression predictions (117) are generated by the regression model (157) from the sensor data (115). In one embodiment, the regression predictions (117) predict the gas (e.g., methane) flow rate for an emission.

The classification predictions (119) are the outputs from the classification model (161). The classification predictions (119) are generated by the classification model (161) from the sensor data (115). In one embodiment, the classification predictions (119) predict if a gas emission is present.

The aggregated classification predictions (121) are aggregated values generated from the classification predictions (119). In one embodiment, the aggregated classification predictions (121) are generated by applying a rolling average to the classification predictions (119).

The combination predictions (123) are values generated from combining the classification predictions (119) with the regression predictions (117). In one embodiment, the combination predictions (123) are generated by applying the aggregated classification predictions (121) to the regression predictions (117).

Continuing with FIG. 1, the system (100) also may include the server (151). The server (151) is one or more computing systems, possibly in a distributed computing environment. An example of the server (151) may be the computing system shown in FIG. 12A.

The server (151) may host and/or execute one or more processes, software, applications, etc. For example, the server (151) may execute one or multiple instantiations of the training application (153) and the inference application (163) using different computing systems and servers. The server (151) may interact with the sensors (175) and the user devices A (180) and B (185) through N (190).

The training application (153) is a collection of programs operating on the server (151). In one embodiment, the training application (153) uses the augmentation generator (155) and the binary generator (159) in preparing the training data (103) and training the regression model (157) and the classification model (161).

The augmentation generator (155) generates the regression training set (107) from the historical data (105). In one embodiment, the augmentation generator (155) processes sensor data from the historical data (105) with one or more physics-based models to generate additional pairs of synthetic data to train the regression model (157).

The regression model (157) is a machine learning model that predicts a gas emission rate. In one embodiment, the regression model (157) is an artificial neural network. In one embodiment, the regression model (157) is a deep neural network (DNN). In one embodiment, the regression model (157) is trained by processing inputs from the regression training set (107) to generate predictions. The predictions are compared to the outputs from the regression training set (107) and the difference or error between the predictions and outputs may be used to update the weights, biases, and parameters of the regression model (157) using back propagation, gradient descent, etc.

The binary generator (159) generates the classification training set (109). In one embodiment, the binary generator (159) processes the regression training set (107) to generate the classification training set (109). In one embodiment, the binary generator (159) replaces the rational number outputs in the regression training set (107) with binary value outputs.

The classification model (161) is a machine learning model that predicts the presence of a gas emission. In one embodiment, the classification model (161) is a deep neural network (DNN). In one embodiment, the classification model (161) is trained by processing inputs from the classification training set (109) to generate predictions. The predictions are compared to the outputs from the classification training set (109) and the difference or error between the predictions and outputs may be used to update the weights, biases, and parameters of the regression model (157) using back propagation, gradient descent, etc.

The inference application (163) is a collection of programs operating on the server (151). In one embodiment, the inference application (163) uses the feature generator (165), the regression model (157), the classification model (161), the aggregation generator (171), and the combination generator (173) to process and generate the inference data (111).

The feature generator (165) generates the sensor data (115) from the raw sensor data (113). In one embodiment, the feature generator (165) may remove rows or columns from the raw sensor data (113). The feature generator (165) may apply additional transformations to clean up, flatten, and filter the raw sensor data (113) and form the sensor data (115).

The regression model (157) in the inference application (163) is a copy or version of the regression model (157) in the training application (153) after at least some training is performed. The regression model (157) is configured to process the sensor data (115) to generate the regression predictions (117). The regression model (157) may be operated by the inference application (163) after being trained by the training application (153).

The classification model (161) in the inference application (163) is a copy or version of the classification model (161) in the training application (153) after at least some training is performed. The classification model (161) is configured to process the sensor data (115) to generate the classification predictions (119). The classification model (161) may be operated by the inference application (163) after being trained by the training application (153).

The aggregation generator (171) is configured to process the classification predictions (119) to generate the aggregated classification predictions (121). In one embodiment, the aggregation generator (171) is configured to apply a rolling average to the classification predictions (119) to generate the aggregated classification predictions (121).

The combination generator (173) is configured to generate the combination predictions (123) from the classification predictions (119) and the regression predictions (117). In one embodiment, the combination predictions (123) are generated by applying the aggregated classification predictions (121) to the regression predictions (117).

Continuing with FIG. 1, the user devices A (180) and B (185) through N (190) may interact with the server (151). The user devices A (180) and B (185) through N (190) may be computing systems in accordance with FIG. 12A and FIG. 12B. The user devices A (180) and B (185) through N (190) may include and execute the user applications A (182) and B (188) through N (192).

In one or more embodiments, the user device A (180) is operated by a user that is a developer to operate the training application (153) generate the regression training set (107) and the classification training set (109) and train the regression model (157) and the classification model (161). Responsive to the developer, the user device A (180) may interact with the server (151) to identify a model, make modifications to the model, identify training sets, and train the models.

In one or more embodiments, the user device N (190) is operated by a user to process information from the inference application (163). The user device N (190) may receive notification or alerts from the server (151) when the combination predictions (123) indicate the presence of a gas emission. The notifications and alerts may be displayed on the user device N (190). The user device N (190) may be used to take remedial action, e.g., shutting a component of a mechanical system to stop the gas emission.

Although described within the context of a client server environment with servers and user devices, aspects of the disclosure may be practiced with a single computing system and application. For example, a monolithic application may operate on a computing system to perform the same functions as one or more of the applications executed by the server (151) and the user devices A (180) and B (185) through N (190).

Figure 2A:
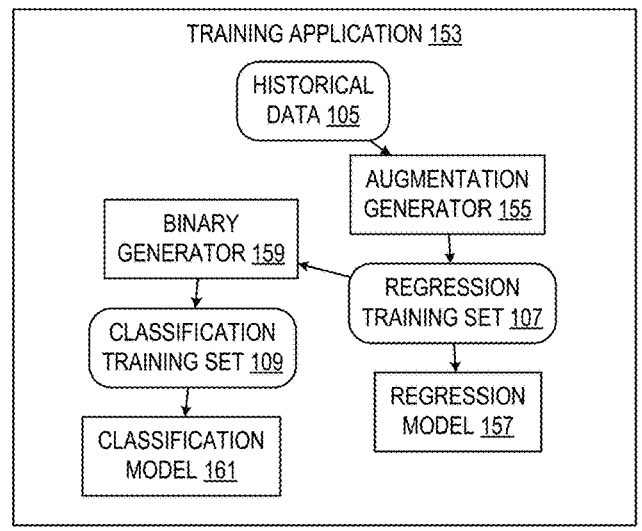

Turning to FIG. 2A, the training application (153) uses the historical data (105) to train the regression model (157) and the classification model (161). The training application (153) may operate in accordance with the embodiments of the other figures. The training application (153) uses the augmentation generator (155) and the binary generator (159) to generate the regression training set (107) and the classification training set (109) and uses the regression training set (107) and the classification training set (109) to train the regression model (157) and the classification model (161).

The augmentation generator (155) is a program that processes the historical data (105) to generate the regression training set (107). In one embodiment, the augmentation generator (155) uses physics-based models to generate the regression training set (107) from the historical data (105). The regression training set (107) is the data used to train the regression model (157).

The binary generator (159) is a program that processes the regression training set (107) to generate the classification training set (109). In one embodiment, the binary generator (159) applies a threshold to the outputs from the regression training set (107) to generate outputs for the classification training set (109). The classification training set (109) is the data used to train the classification model (161).

The regression model (157) is a machine learning model that is trained with the regression training set (107). The regression model (157) is trained to generate predictions from inputs from the regression training set (107) that correspond to outputs from the regression training set (107). For example, the regression model (157) is trained to generate a prediction of a gas emission flow rate from inputs that identify wind speed, wind direction, solar radiation, humidity, temperature, pressure, etc.

The classification model (161) is a machine learning model that is trained with the classification training set (109). The classification model (161) trained to generate predictions from inputs from the classification training set (109) that correspond to outputs from the classification training set (109). For example, the classification model (161) is trained to generate a prediction of whether a gas emission is present from inputs that identify wind speed, wind direction, solar radiation, humidity, temperature, pressure, etc.

Figure 2B:
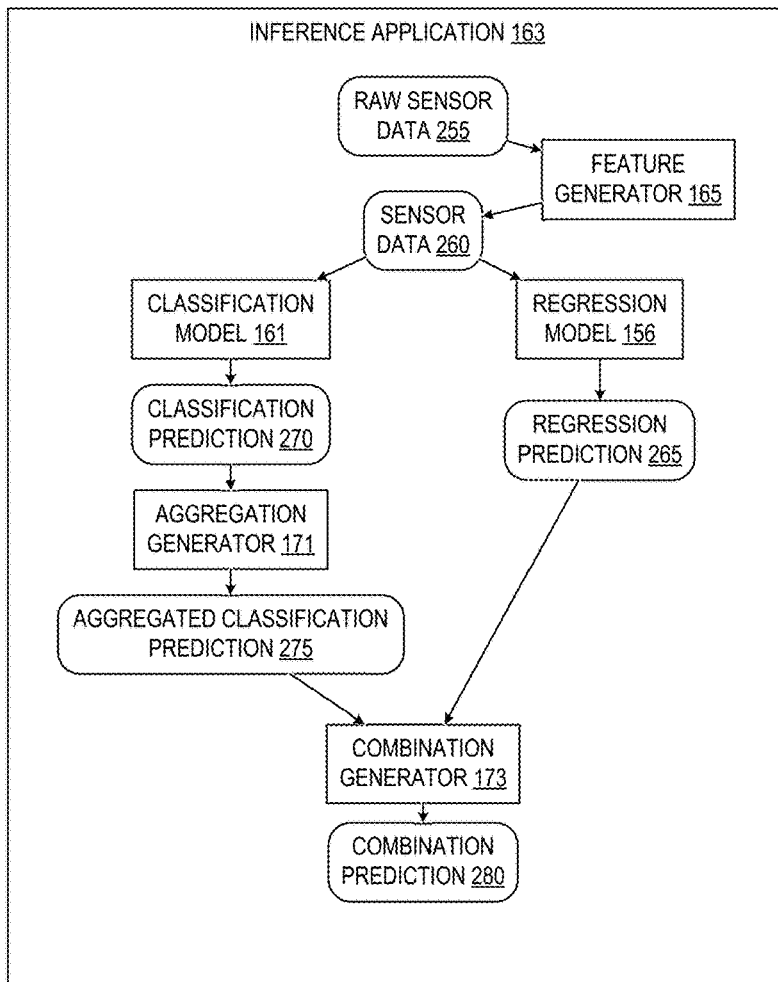

Turning to FIG. 2B, the inference application (163) uses the raw sensor data (255) to generate the combination prediction (280). The inference application (163) may operate in accordance with the embodiments of the other figures. The inference application (163) uses the feature generator (165), the regression model (157), the classification model (161), the aggregation generator (171), and the combination generator (173).

The raw sensor data (255) is data captured from sensors at a facility. In one embodiment, the raw sensor data (255) may be live data that is streamed from a sensor to a computing system.

The feature generator (165) is a program that processes the raw sensor data (255) to generate the sensor data (260). In one embodiment, the feature generator (165) may apply filters and thresholds to clean up the raw sensor data (255) and form the sensor data (260).

The sensor data (260) is data suitable for input to the regression model (157) and the classification model (161). The sensor data (260) may include values for wind speed, wind direction, solar radiation, humidity, temperature, pressure, etc.

The regression model (157) is a machine learning model that is applied to the sensor data (260) to generate the regression prediction (265). The regression model (157) is trained by the training application (153). The regression model (157) may be an artificial neural network that includes multiple layers (embedding layers, hidden layers, fully connected layers, transformer layers, long short-term memory (LSTM) layers, etc.) that process successive outputs to generate the regression prediction (265).

The regression prediction (265) is the output from the regression model (157). The regression prediction (265) is a prediction of the flow rate of a gas emission at a facility where the sensors that generated the raw sensor data (255) are located.

The classification model (161) is a machine learning model that is applied to the sensor data (260) to generate the classification prediction (270). The classification model (161) is trained by the training application (153). The classification model (161) may be an artificial neural network that includes multiple layers (embedding layers, hidden layers, fully connected layers, transformer layers, long short-term memory (LSTM) layers, etc.) that process successive outputs to generate the classification prediction (270).

The classification prediction (270) is the output from the classification model (161). The classification prediction (270) is a prediction of whether a gas emission is present at the facility where the sensors that generated the raw sensor data (255) are located.

The aggregation generator (171) is a program that processes the classification prediction (270) to generate the aggregated classification prediction (275). In one embodiment, the aggregation generator (171) applies an aggregation model to a set of recent classification predictions including the classification prediction (270). For example, the aggregation generator (171) may apply a rolling average to the 10 (or 20, or 100, etc.) most recent predictions from the classification model (161) to generate a rolling average value as the aggregated classification prediction (275). The aggregation models used may include arithmetic mean, geometric mean, harmonic mean, median, etc.

The aggregated classification prediction (275) is the output from the aggregation generator (171). The aggregated classification prediction (275) is an aggregation of a set of recent classification predictions. In one embodiment, the recent classification predictions include the last threshold number (10, 50, 100, etc.) of classification predictions. In one embodiment, the recent classification predictions include the classification predictions for a predetermined time (e.g., predictions for the last 5 minutes, 10 minutes, 1 hour, etc.).

The combination generator (173) is a program that processes the aggregated classification prediction (275) and the regression prediction (265) to generate the combination prediction (280). In one embodiment, the combination generator (173) applies a threshold to the aggregated classification prediction (275), which is then used to mask the regression prediction (265). For example, with a threshold of 0.6, when the aggregated classification prediction (275) is equal to or greater than the threshold, then the combination prediction (280) is the regression prediction (265). When the aggregated classification prediction (275) is less than the threshold, then the combination prediction (280) is "0". In one embodiment, the output of the threshold comparison is multiplied by the regression prediction (265) to calculate the combination prediction (280).

The combination prediction (280) is the output from the combination generator (173). In one embodiment, the value of the combination prediction (280) is "0" when there is no predicted emission. When an emission is predicted, the combination prediction (280) is the value from the regression prediction (265), the gas emission flow rate.

Figure 3:
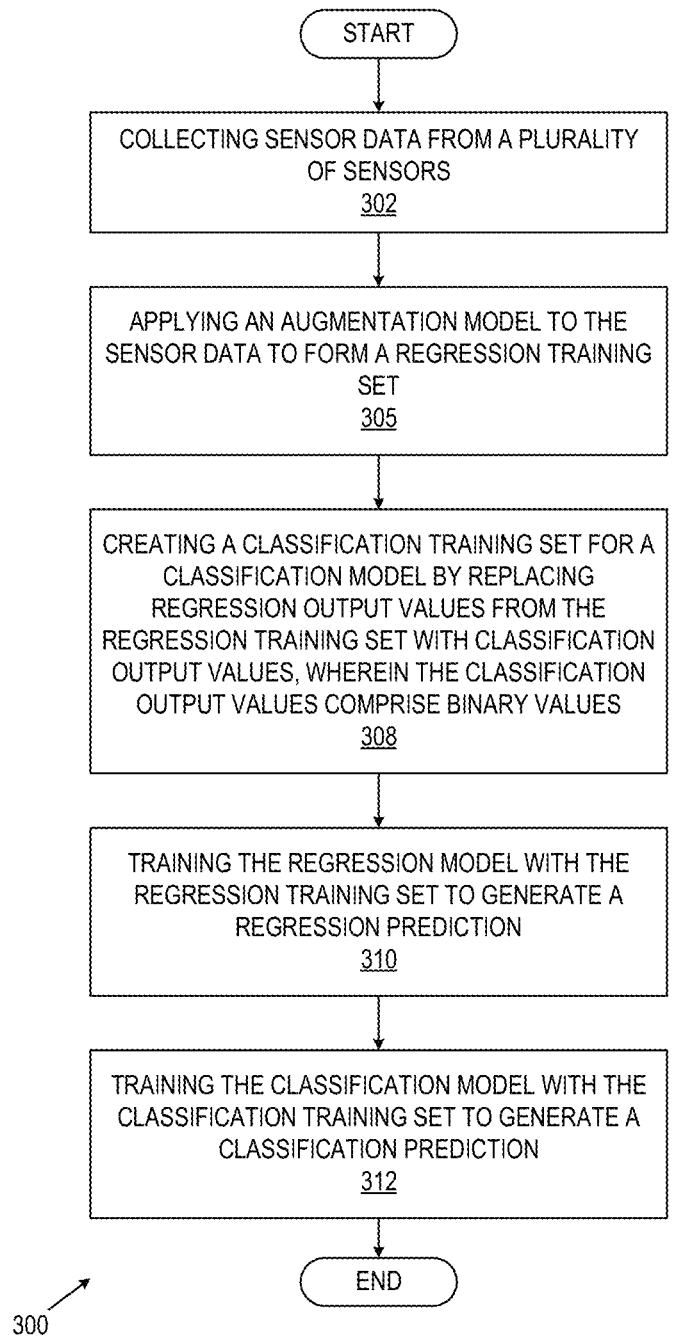
FIG. 3 shows a method in accordance with one or more embodiments.

Turning to FIG. 3, the process (300) implements gas emission monitoring using machine learning. The process (300) includes multiple steps that may execute on the components described in the other figures, including those of FIG. 1 and FIG. 12A. In one embodiment, a system may include at least one processor and an application that, when executing on the at least one processor, performs the process (300). In one embodiment, a non-transitory computer readable medium may include instructions that, when executed by one or more processors, perform the process (300).

Block 302 includes collecting sensor data from a plurality of sensors. Signals from various sensors are received and processed. The sensors, strategically positioned in diverse locations, encompass a range of environmental and physiological parameters, including gas levels (e.g., methane levels), wind speed, wind direction, solar radiation level, etc. Upon initiation, the sensors may detect and transmit data to a computing system, where the information is gathered and logged. The collected sensor data may be organized using predefined protocols and algorithms. For example, the sensors of the system may output JavaScript object notation (JSON) text including that concludes data from the sensors as well as meditated and describing the data from the sensors. In one embodiment, the output from the sensors may be structured into a tabular format, delineated by columns representing distinct data types and rows corresponding to different timestamps. In one embodiment, a sensor may provide a row of data that a computing system receives and appends to a table.

Block 305 includes applying an augmentation model to the sensor data to form a regression training set. In one embodiment, recorded from the sensors may be used to calibrate one or more physics-based models, which may include a computational fluid dynamic model or a Gaussian plume model. The data from the sensors may then be manipulated to change wind direction, wind speed, solar radiation amount to form synthetic inputs. The physics-based models may then be applied to the synthetic inputs to generate corresponding synthetic outputs. These synthetic inputs and the synthetic outputs may be paired together to form augmented data that may be combined with the original sensor data to form the regression training set of data.

Block 308 includes creating a classification training set for a classification model by replacing regression output values from the regression training set with classification output values. In one embodiment, the classification output values include binary values. The regression training set includes regression output values that identify a gas emission rate that corresponds to a set of input values. When the regression output value (i.e., the gas emission rate) is greater than a rate threshold value (e.g., 0.01), then the regression output value may be replaced with a value of "1" for a classification output value. When the threshold is not met, the regression output value may be replaced with a value of "0" for the classification output value. Replacements may be made for each of the pairs of inputs and outputs from the regression training set to form the classification training set.

Block 310 includes training the regression model with the regression training set to generate a regression prediction. In one embodiment, the regression model is an artificial intelligence neural network model. The regression model may be trained by applying the regression model to inputs from the regression training set to generate training outputs from the regression model. The training outputs are compared to outputs from the regression training set to identify the error between the training outputs and the outputs from the regression training set. The error may then be fed back to the regression model to update the weights, biases, parameters, etc., of the regression model using back propagation, gradient descent, etc.

Block 312 includes training the classification model with the second training set to generate a classification prediction. In one embodiment, the classification model is an artificial intelligence neural network model. The classification model may be trained by applying the classification model to inputs from the classification training set (which may be the same as the inputs from the regression training set) to generate training outputs from the classification model. The training outputs are compared to outputs from the classification training set to identify the error between the training outputs and the outputs from the classification training set. The error may then be fed back to the classification model to update the weights, biases, parameters, etc., of the classification model using back propagation, gradient descent, etc.

In one embodiment, the regression model and the classification model may be used after training, during inference, to generate predictions of whether a gas emission is present in a system. Generating the predictions includes applying the classification model (after training) to input data to generate a classification prediction. Generating the predictions may further include applying an aggregation model to the classification prediction to generate an aggregated classification prediction. Generating the predictions may further include applying the regression model to the input data to generate a regression prediction. Generating the predictions may further include applying the aggregated classification prediction to the regression prediction to generate a combined prediction. After generating a prediction, a message may be presented with a combined prediction over a computer network. The message may be transmitted to multiple client devices to update the users of the devices about the state of these system.

In one embodiment, the sensors include a sensor that provides multiple features and a regression output, which form a portion of the sensor data. The multiple features may include meteorological data with wind and solar conditions, which are used as inputs to the models of the system. The regression output represents the gas emission rate that identifies the amount of gas emitted over a period of time and may be used as the output to which a training output is compared during model training. In one embodiment, the sensors provide raw sensor data with values for meteorological conditions that includes values for wind conditions.

In one embodiment, the process (300) includes applying a transformation to raw sensor data to generate the sensor data. The transformation may include applying a filter to the raw sensor data. The filters may identify ranges of values, values that satisfied certain thresholds, etc. to remove values, columns, rows, etc. of raw sensor data to form the sensor data.

In one embodiment, the process (300) includes applying a transformation to raw sensor data to generate the sensor data, the transformation comprising flattening the raw sensor data. Flattening data may include rounding, truncating, etc., values from the raw sensor data to form the sensor data.

In one embodiment, the process (300) includes applying a transformation to raw sensor data to generate the sensor data, the transformation may include removing an empty row from the raw sensor data to form the sensor data. The transformation may also include removing a number of features from the raw sensor data, which may remove a column of data from the raw sensor data to form the sensor data.

In one embodiment, the process (300) includes applying the augmentation model to the sensor data. In one embodiment, the augmentation model includes a computational fluid dynamic (CFD) model. In one embodiment, the augmentation model includes a Gaussian plume model (GPM). The CFD model and the GPM model are physics-based models. The inputs of the physics-based model is synthetic sensor data and the output is the synthetic amount predicted to be emitted (e.g., unit volume per unit time) based on the synthetic sensor data. For example, the wind speed of a set of sensor data may be changed and the physics-based model is applied to the synthetic set of sensor data to generate the synthetic output.

In one embodiment, collecting the sensor data includes multiple steps. Collecting the sensor data may include creating a training database for a particular facility and a sensor layout by a direct method. Collecting the sensor data may further include generating a series of test releases of a pollutant (e.g., a gas, e.g., methane) at different rates that form the regression outputs used by the system. Collecting the sensor data may further include detecting concentrations for a range of wind and other meteorological conditions at the sensors in which the concentrations are the regression outputs and the wind and other meteorological conditions are inputs paired with the regression outputs. Collecting the sensor data may further include moving an emission source to various places around a facility and repeating the collection of measurements. In one embodiment, applying an augmentation model to the sensor data includes performing forward modeling of expected concentrations at the sensor locations based on a computational flow dynamics model or a simplified physics-based model such as the Gaussian plume model.

In one embodiment, the classification prediction is part of a set of classification predictions to which an aggregation model is applied. In one embodiment, applying the aggregation model comprises applying a rolling average to the set of classification predictions to generate an aggregated classification prediction.

In one embodiment, the regression prediction is combined with an aggregated classification prediction. The combination may be performed by applying the aggregated classification prediction to the regression prediction by multiplying the aggregated classification prediction by the regression prediction to generate the combined prediction.

Figure 4:
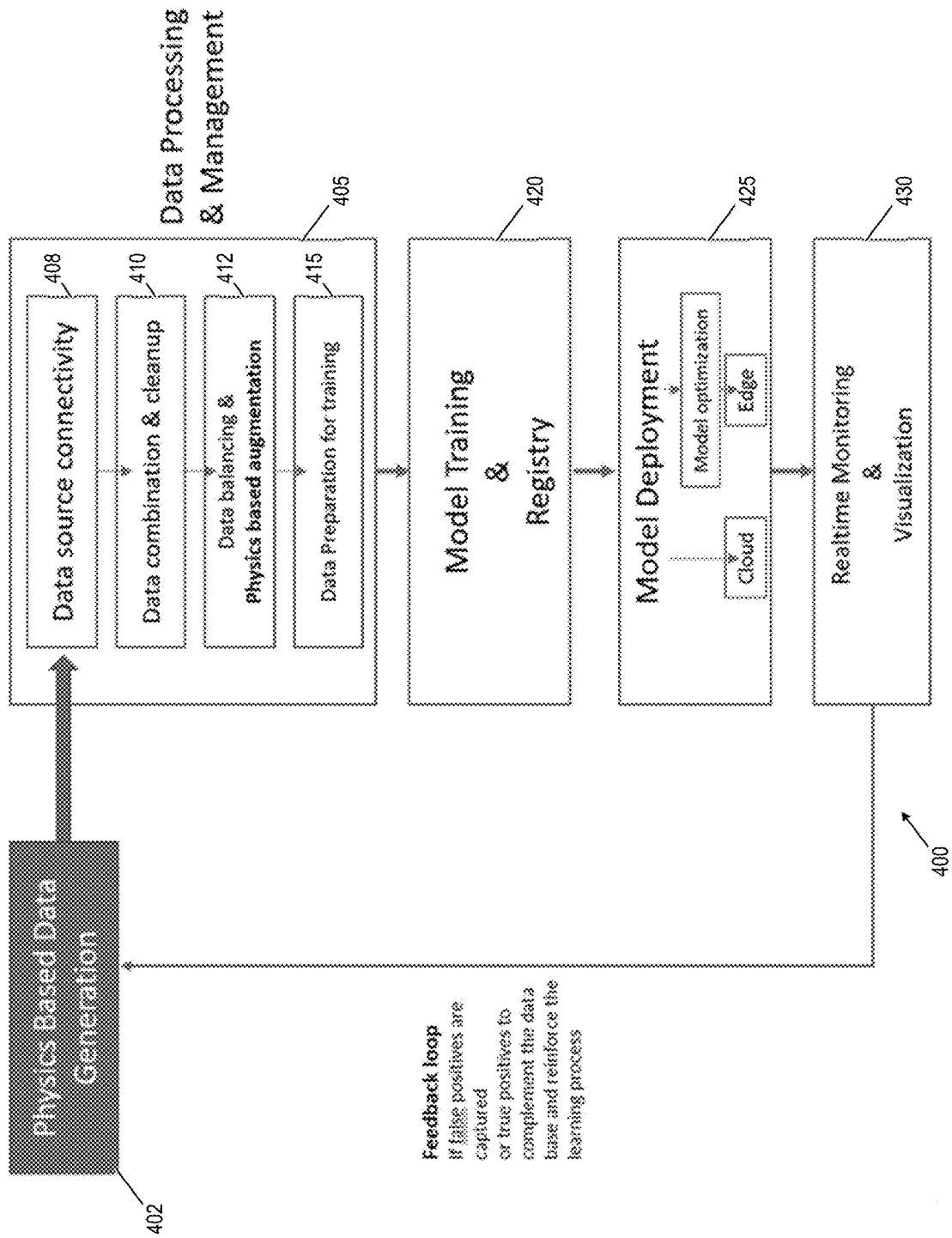

Turning to FIG. 4, the steps of the framework (400) to monitor emissions using machine learning are illustrated. A training database and a prediction algorithm use infrastructure that includes detector hardware sensing pollutant concentration and meteorological parameters as well as firmware and connectivity to transmit and process the data into the format suitable for the machine learning model to generate predictions. The infrastructure fits into a larger framework of the installation and data acquisition at a particular facility.

Figure 6:
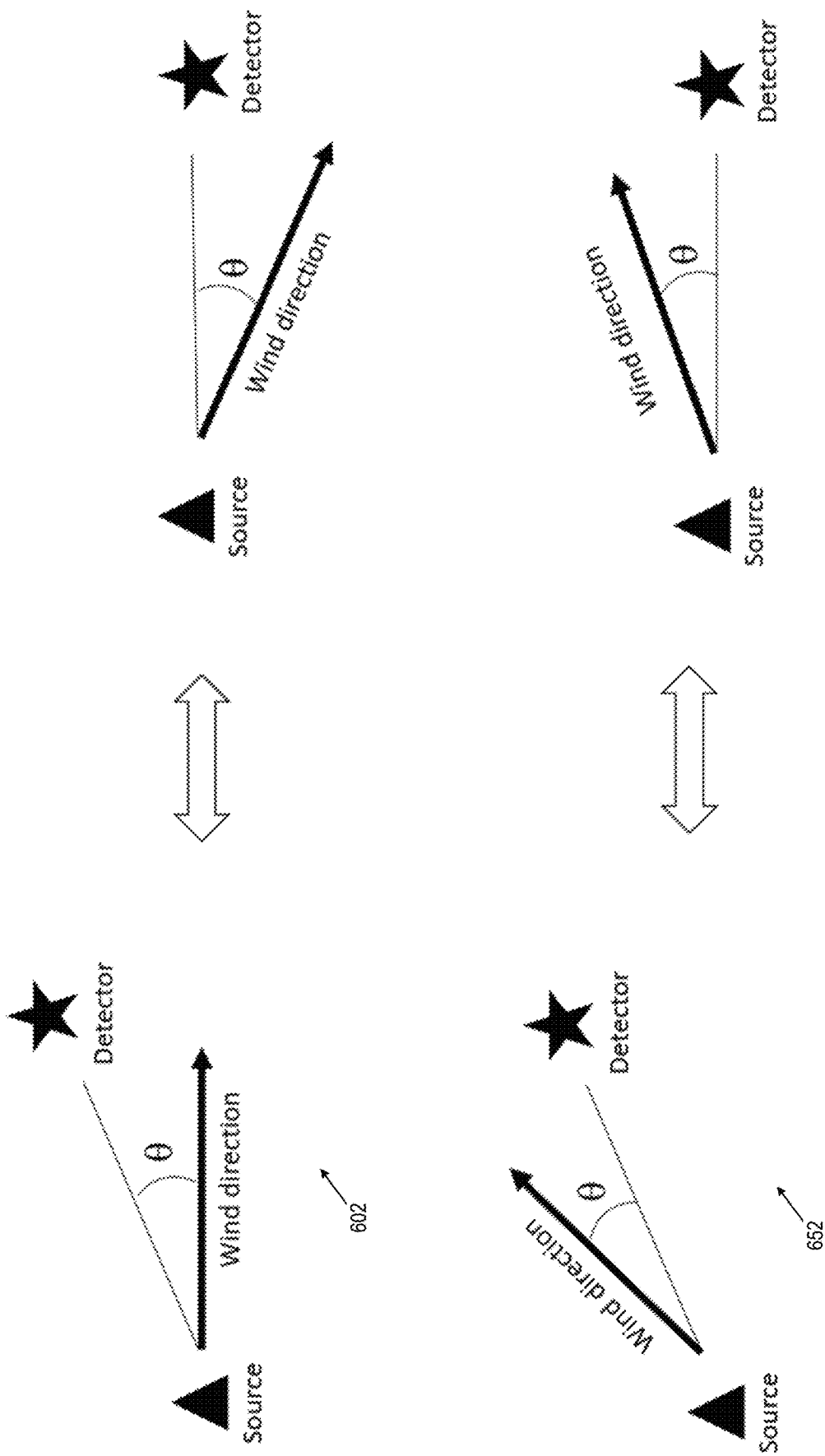

Rather than attempting to transfer the actual trained machine learning model from one facility or sensor configuration to another, the framework (400) of FIG. 4 shows a procedure to modify and augment the underlying database to represent the new facility and then create a completely new model for the new facility based on the updated database. The modification and augmentation utilize the underlying physical symmetries including rotational and translational symmetries for source-sensor axis alignment relative to wind direction and the source-sensor distance, as shown in FIG. 6. Other parameters are kept the same (e.g., same release point, same atmospheric conditions) so that the pollutant concentration may be first order proportional to the release rate. A momentum term may change with the release rate and thus affect the detailed plume shape and dispersion; however, variations related to the release point geometry, and variations of emission source geometries may be second-order effects.

Figure 7:
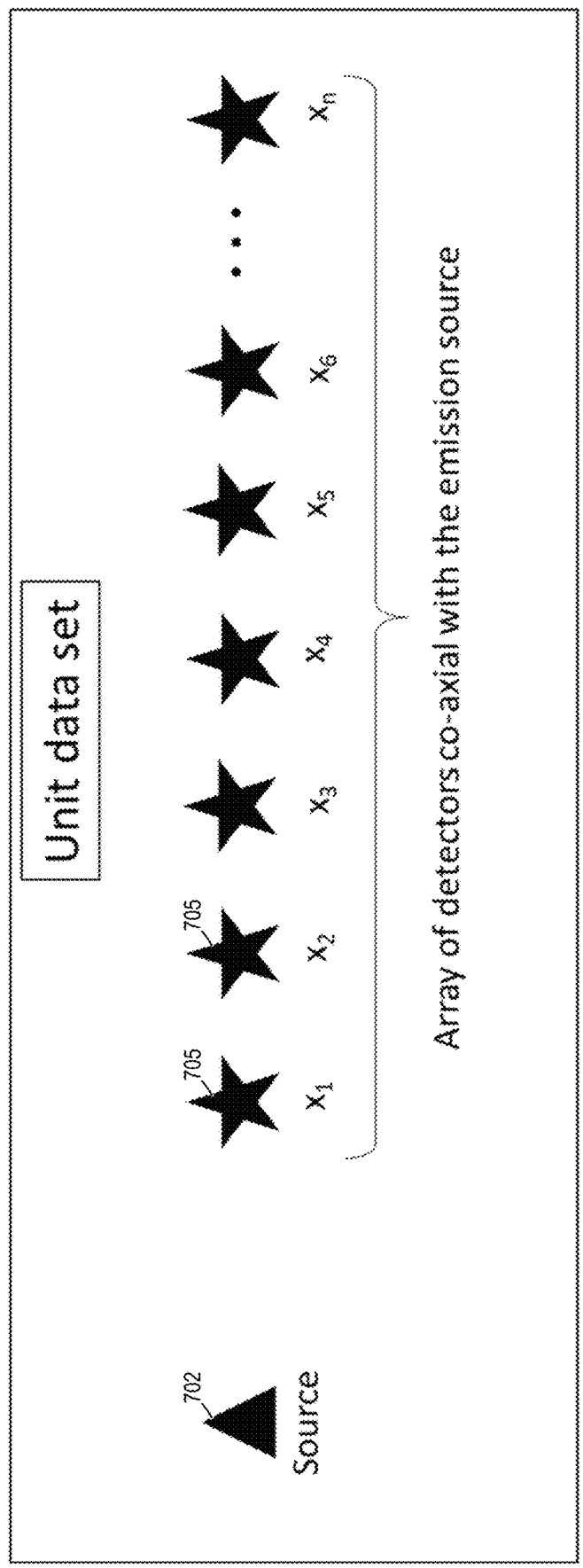

Continuing with FIG. 4, generation of the unit dataset may be performed at Block 402. The unit dataset includes a set of measurements for known releases from a single release point or source collected at a series of co-linear measurement points as shown in FIG. 7. The source is placed at the origin but may be at different heights above ground. The sensors or measurement points may be at the same height, if that is the planned deployment strategy, or may be at a range of heights. One way to generate the unit dataset is via an extensive field test campaign. Such a campaign may include an actual release station where the pollutant (e.g., methane) is released at a range of known rates of interest in the eventual application.

For example, if the target for emission detection and quantification is between 0.1 kg/hr and 100 kg/hr, the emission rates in the field test may span that range (but see below on data augmentation techniques). Furthermore, the field test campaign may last long enough to span a range of different meteorological conditions, e.g., wind speeds and directions and solar radiation intensities, of interest in the eventual application. For example, if the system is to be deployed in the region where winds vary from 1 meter per second (m/s) to 30 m/s, then the range covered in the field tests should be the same or similar. The detectors may be spaced at different distances from the source, as densely as feasible to minimize the extent of interpolation to generate augmented data. The sensors may not be co-linear as the sensor locations may be mapped onto the line co-axial with the source using the procedure outline before, by rotating the wind appropriately. Having the sensors dispersed rather than co-linear may capture a wider range of wind conditions with fewer iterations. If the sensors are not co-linear, any interpolation in space between the sensors becomes more complicated in order to match the wind conditions. The range of detector-source distances may be wide enough for the eventual application, while dense enough to avoid extensive interpolation.

The data acquisition scheme includes a sampling rate. Higher sampling rate may generate more data but may be more prone to short-time-scale turbulence that averages out over tens of seconds or minutes. Thus, higher sampling rate may not necessarily generate more information. Additionally, screening may be based on atmospheric quality, and suitable weighting factors, may be applied to improve the quality of the dataset.

An alternative way to generate the unit dataset is via computational fluid dynamic (CFD) or via any other statistical model such as the Gaussian plume model (GPM) or other models of atmospheric dispersion. The numerical models may be used alone or in combination with actual physical measurements by using the measurements for calibration of model parameters such as closures for the CFD simulation. While real physical measurement may be used, the numerical techniques have improved over the years and may provide suitable material for the unit dataset. In some circumstances, with complex terrain for example, CFD might even offer some advantages. In accordance with the disclosure, a single set of measurements may be generated, rather than having to repeat the full multi-parameter simulation for each potential facility where the sensors are to be deployed.

In order for the unit dataset to be applicable, the terrain may be similar to the terrain of interest in the actual sensor deployment scenario. For example, for sensors to be deployed in an open grassy prairie-like terrain, a unit dataset acquired or computed in an open grassy setting should be used to generate the database. For sensors to be deployed in a mountainous rocky terrain or forest-covered terrain or terrain with many large structures such as may be present in urban settings or at some oil and gas facilities, a unit dataset generated in similar settings should be used.

Continuing with FIG. 4, data processing and management may be performed at Block 405.

The data processing Block 405 includes data source connectivity Block 408, data combination and cleanup Block 410, data balancing and augmentation Block 412, and data preparation for training Block 415.

The data source connectivity Block 408 provides the flexibility to connect to one or more data sources (also referred to as unit datasets). Entitlements may be implemented through an access control list (ACL) to specify who may visualize/exercise the steps of the framework (400) on the data to which the system is connected.

Each data source a user has access to (through the ACL) is associated to a set of measurements (M) picked up from point sensors (S) associated to a specific geography tag. In the data combination and cleanup step, the data is visualized and processed dynamically. Data may be visualized and processed per ACL and per one or a combination of the (M) measured parameters such as geography etc. . . . Example: If a user is entitled to have access to 5 datasets 3 of which lie within same geography the user may be able to run specifically processing on these 3 datasets to gain collective insight from them. An example of data collected on the field in Lubbock Texas with a set of 11 measurements (M=11) picked from 8 sensors (S=8) whereby for each timestamp, measurements such as: CH4 concentration average (concentration_avg), solar radiation average are collected is shown in FIG. 10. Each sensor may be localized in 3d with X, Y, Z coordinates (relative to the geography tag where the measurements where collected) and thus for each timestamp, measurements may be picked up for each of the sensors, e.g., if there are S sensors then each timestamp may have S rows in the data table. An example of an extract of data is shown in FIG. 10.

The data might include pollutant concentration, the corresponding standard deviation, mean, or other modes of the concentration distribution, various types of meteorological data such as wind speed and direction with corresponding means and standard deviations or other modes, solar radiation again with means, standard deviations, etc. Thus, the values of M can range drastically from one setup to another. Moreover, the data is timestamped or otherwise synchronized to ensure temporal link between different data streams is maintained.

These measurements may contain the pollutant concentration (e.g., average CH4 concentration) at a specific time. Also, the measurements may be associated to separate files containing known emission rate (if available) at that time (using the timestamp for a temporal link to match measurements to emission rates). Should the emission rate measurements be available, the dataset may be flagged to be used for the purpose of training of one or many models. If the emission rate measurements are not present, the dataset may rather be flagged as to be used for the data augmentation Block 412 of the data processing and management Block 405 and/or real time monitoring and visualization Block 430.

Figure 11:
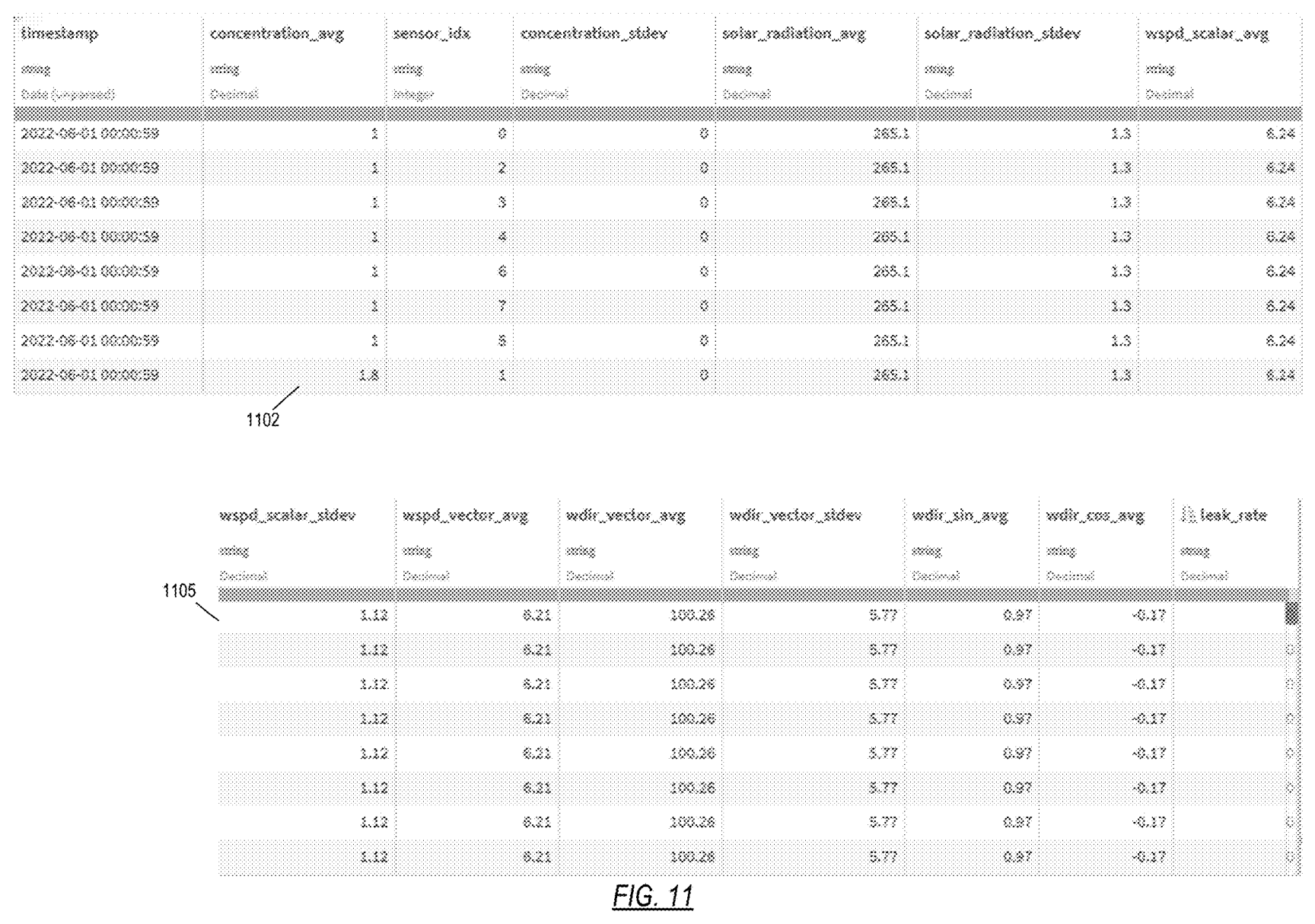

In the data combination portion of Block 410, assuming the data has been tagged for training purposes (contains emission rate measurements information) the framework (400) may automatically combine the emission rate files information to the M measurements data using the timestamp/sensors (X, Y, Z) location. Each (X, Y, Z) location may be replaced on both emission rate data and measurements data with unique sensor identifiers which may enable to link both files with the support of timestamp into a single file containing M measurements per timestamp for each of the S sensors with the associated emission rates. An example of how the data may look like following the first validation and cleanup step on a setup containing S=8 sensors ranging from 0-7 is shown in FIG. 11.

Further, the data flattening part of the data combination may be performed. In data flattening, the data is unfolded whereby rather than having M measurements per sensor per timestamp the output may be structured so that each timestamp has M (measurements)×S (sensors)+1 (for the emission rate) columns where each original measurement may be appended with the sensor ID the measurement came originally from. The format (or subset thereof) may be used for training purposes. Also, the data combination is an optional step as the data may be already provided in the flattened format used for training purposes as described above or a subset of the measurements.

When the data combination is completed, the cleanup portion of Block 410 kicks in to check that each row of the generated combined data has values attached to them (no measurements are missed or empty). By way of an example, if some measurements do not have an emission rate associated to the measurements (emission rate value for a certain time step is empty), the timestep may be highlighted and the user interface may allow the user to either specify to automatically set these occurrences to a 0 value or to discard the row from the combined dataset.

Once the data combination and cleanup Block 410 is completed, the data balancing and augmentation Block 412 may start. Block 412 starts by providing means to visualize the data distribution enabling to pinpoint if the emission rates distribution is well balanced. If the data distribution is not well balanced, e.g., majority of recorded emission rates are 0 and a small subset is with values raging within a small interval, then the framework (400) may work on balancing and augmenting the data using physics-based augmentation described hereafter in details.

First, the balancing step isolates the data points associated to a null (0) emission rate from the ones that are non-null and count the number of data points in these categories. Based on the ratio between null values/non null values, the framework (400) may automatically suggest augmenting the dataset with a number of data points reducing the final ratio to no more than 60% (e.g., no more than 60% null values vs non null values). For example, taking the sensor data, if the number of data rows with an emission rate equal to zero account for 12000 and the number of rows with a recorded non null emission rate equals to 3000, then the ratio equates to 20%. The data balancing and augmentation step may suggest augmenting the non-null emission rate data to reach 8000 rows for a rebalanced dataset of 20000 data points. Alternatively, the data balancing and augmentation may also enable the user to reduce the input data with null values while keeping the total rows of data with non-null values to reach around 60% ratio—i.e., 7000 randomly selected values from the original 12000. It also enables the end user to select any combination in between.

The augmentation portion of Block 412 may be performed using the physics-based augmentation based on the symmetries of the system at the stage of creating the unit dataset and expanding the unit dataset to arbitrary sensor configuration.

Additionally, the background noise from which the background measurement $C_{bkgr}$ is being extracted may change with time, due to, for instance daily atmospheric boundary layer variability, relative humidity changes, etc.; or due to sensor drift over time, which is quite common with low-cost methane sensors such as metal-oxide; or due to actual background variability caused by nearby agricultural activity, other production facilities coming online, and so forth. Furthermore, the background measurement $C_{bkgr}$ may be sensor-dependent, i.e., may be different for each sensor deployed, as again, for low-cost sensors, the calibrations may be off, and different units may drift with time differently and so forth.

A solution is to compute the background as a running window that is short, e.g., 24 or 12 or 6 hours, by taking the mean of the readings of a particular sensor over that window excluding the periods of actual emission events. For the training set, the timing of the emission events is known because the timing is provided as the ground truth. Thus, for a given emission event, the background value to be used is then computed from the window extending up to that emission event. Recall that for augmentation the data is used with the emission event turned on and ignore the data acquired with no emission. If the model was trained on data with the background subtracted, then the background may also be subtracted from the test data, or data on which the ready model is to be run. The emission event may be detected first so that the background computation window may be stopped and background value frozen at the most recent value prior to emission detection. Emission detection itself may be implemented by any algorithm, including the one used for the classifier. If the model was trained on data with background, then no background subtraction may be done before applying the model to the test data. Whether the model is trained on data with or without background, the augmentation step itself may use background subtraction as described in the text.

In addition to the variable background, which is the real methane concentration present in the location of the sensor that is not attributable to the emission event of interest, there may be sensor noise, i.e., spurious readings of stochastic nature based on the physics of the sensing element and the acquisition electronics, low-noise amplifiers, analog-to-digital converters and so forth. The noise may be accounted for properly in the augmentation Block 412.

In an embodiment, for a row of data to be augmented, at least one of the sensors for the row may provide a reading above the noise level once the background is subtracted. The noise threshold may be fixed by the standard deviation of the noise signals and can be set to s or 2s or 3s. Using the noise threshold prevents augmenting the noise. The signal from the sensor(s) reading >s or 2s or 3s above background may be augmented as described while the other sensor readings may remain unchanged.

Assuming the data went through the data balancing and augmentation Block 412, the data preparation Block 415 for deep neural network (DNN) model training may be performed. The data preparation Block 415 guides the machine learning training and quality assessment of the model. In other words, the data preparation step may include splitting the data by tagging into data for training (validation) and data for testing. One example of split may be that random 70% of the data may be tagged as train, subsequent random 15% may be tagged as validation and last 15% tagged as test. Once the data is split into three through tagging, the next step may be to normalize the data since the data is basically in different units at the tag level. First by normalizing the training data and then applying the same scaling as for your training data on the validation and the test data. For the normalization, that step may be delegated to be done as part of the model training step by adding a normalization layer that is adapted to the train data.

After creating a unit dataset and using the unit dataset to generate a training dataset for a particular sensor configuration for an actual deployment in the real-life scenario, the data may be augmented. Physics-based data augmentation techniques may be used to augment the unit dataset that has been processed in the previous Blocks 408 and 410 efficiently without the excessive experimental or simulation burden. Without the following data augmentation, the parameter space to be considered may be so large that the experimental or modeling campaign to generate a complete unit dataset as described might take years making the whole exercise impractical and consequently limiting the deep neural network training performance.

The data augmentation technique in Block 412 may be based on the realization that the change in the emission rate generally does not, to first order, affect the distribution of turbulence and pollutant dispersion patterns in the atmosphere near the release point, but merely affect the concentration levels of the pollutant. Since the initial jet momentum for the typical accidental gas release or emission of interest to the application is unknown and can vary hugely depending on the details of the particular emission, the initial jet momentum may not be a useful parameter to consider. Ignoring the initial jet momentum, or assuming a diffuse emission, then the change with a changing emission rate is the overall pollutant concentration at each point, which may be proportionate to the emission rate. In particular, if for a particular set of meteorological conditions for a given emission rate Q the measured concentration at a point in space is C, then for the emission rate Q' released from the same point and at identical meteorological conditions, the expected concentration at the same point in space may be C'=(C−Cbkgr)*Q'/Q+Cbkgr where Cbkgr is the background concentration of pollutant at that point. Using this approach allows the augmentation of the measurements or computation of concentrations in the unit dataset obtained for a single emission rate to span an arbitrarily wide range of emission rates, within the limitation of the jet not affecting the plume trajectory. For the application at hand this provides an approximation for each of the types of diffuse emissions or more generally for small emissions less than 100 kg/hr.

The type of augmentation to the data to provide the greatest amount of useful information in the training set for the smallest number of additional data points may be related to the physics and the type of the machine learning model used. Embodiments may provide the model with more data in the lower signal-to-noise range with respect to the background signal level. When selecting the Q' emission rates to augment the original Q emission rate, the distribution may be skewed toward lower values so that there are more datapoints with low release rate and poor signal-to-noise to give the model additional training in the more challenging parameter range. One such scaling to use may be to have the spacing between subsequent computed synthetic emission rates Q' increase quadratically, thus lowering the point density for higher emission rates and keeping the overall signal-to-noise more evenly distributed.

Resuming the example from the description of Block 412, to augment the 3000 rows of data to 8000 rows of data, the algorithm may start first by computing the average CH4 background for each sensor over each of the 12000 data entries with the emission rate equal to 0. Once the background (Cbkgr) value is computed, the new 5000 data points may be generated. The method starts by picking 1000 random data points from the 3000 unit dataset that have emission rates associated to them and then compute 1000 new data points out of these such that these 1000 data points emission rate value may be the original emission rate*Q'/Q and their CH4 concentration C'=(C−Cbkgr)*Q'/Q+Cbkgr where C is the original measured concentration. The process is repeated 5 times with different Q' values in which the Q'/Q ratio values follow the distribution described in the previous above.

Another physics-based data augmentation technique used in the augmentation portion of Block 412 operates with the pollutant blowing downwind with the spread of maximally +/−10 degrees due to dispersion around the mean wind direction. Thus, when generating the unit dataset, the method does not measure or model over the whole range of meteorological parameters and emission rates for wind directions deviating more than 10 degrees from the source-detector axis. Concentrations for each of these parameters can be safely set to the background value without compromising the quality of the dataset. This is illustrated schematically in FIG. 11. This technique may be used when transferring the unit dataset to an arbitrary sensor configuration when generating the complete training dataset for a full facility, to have the concentration measurements from each of the sensors for each set of inputs of meteorological conditions.

The model training and registry Block 420 may be performed after execution of the data processing and management Block 405. The unit dataset is generated and then transferred to a particular sensor configuration at the facility of interest to create the customized training database. The Block 420 involves using the database to create the machine learning model that accurately predicts the emission rate and location based on the methane concentration, wind speed and direction, and solar intensity data picked by a fixed set of sensors from a particular geographic location. The training, validation and testing sets for the regression-based model come from the database generated in the Block 410 and augmented with physics-based techniques in the Block 412.

The framework (400) now is ready to train the DNNs (e.g., a regression model and a classification model), for the number of epochs specified by the user, on the data provided by the data processing and management Block 405 of the framework (400), logging relevant metrics in the meantime, and saving the best model at the end of the training time, which may be used as a checkpoint for a user.

A DNN model used by the system may contain a fixed set of layers, which may include a normalization layer (if not done at the data preparation step), hidden layers, and an output layer.

The hidden layers may include five or more hidden, non-linear, dense layers with the rectified linear unit (ReLU) activation function nonlinearity. The hidden layers capacity may be set according to the number of input features. Should the number of input features be large, then the capacity of the network may be big, and the dense layers may have a higher number of units. In one embodiment, the number of units per layer may be 256.

The output layer may include a linear dense single-output layer. The output layer may provide outputs that predict an emission rate.

The model may be trained using a batch size 64 or more. After the training in Block 420, the model is evaluated against the test set, and each result may be logged into a separate file for later review, which may be after the end of the experiment. The content of the file may be used later on to assess the success of the model. Should the model be successful, i.e., perform to the set specification based on the metric selected by end user such as the Root Mean Square Error, then the DNN model is ready to be registered using the call model registry. In practice the model may be stored in a repository blob object file storage. More precisely the DNN model is saved with metadata such as model architecture, model version, hyperparameters used, best achieved score, loss metric used, link to train, validation, and test data. Once the model registry is completed the model is ready to be deployed and advance to the next step of the framework (400) described hereafter.

The training and registration Block 420 may be complemented with an active learning loop. For the active learning loop, once the training of the model is completed, training points that may provide uncertain predictions may be selected for future training.

The model deployment Block 425 may be performed after Block 420. The system may deploy a trained and registered model on the cloud or at the edge.

For the cloud, the use of a representational state transfer (REST) application programming interface (API) with online endpoints allows the user to deploy the trained and registered model without having to create and manage any underlying infrastructure as well as potential server clusters.

For the edge deployment, once the model is trained and registered, the model is sent to the edge device that may be running the real time inference at the edge. With the model trained to compute emission rate based on performant hardware, chances are that the edge device may not be as powerful as what the cloud offers or a local machine with dedicated graphics processing unit (GPU). Thus, the framework (400) enables the users to extract as much performance as possible out of the edge device by a model optimization step. The model optimization step may use open source formats (e.g., open neural network exchange (ONNX)), which after converting the registered model into a model file that records the architecture, numerical parameters, and associated metadata for the model, a runtime is generated to deploy to CPU, GPU, FPGA or NPUs. Other deployment frameworks may be used for different operating systems and processing hardware.

Should the model be updated at the training/registry (e.g., new version of the model is available), then the end user may be notified of the ability to redeploy the newly trained model at a set time. Setup on the edge enables a blue/green (e.g., redundant) environment. Blue may be the current deployed environment on which the current version of the model is running at the edge. Green may be a newer version of the model. When the new model version is available to be deployed, the existing model does not incur a considerable shutdown. Rather, a near zero-downtime deployment experience may be provided from the end user perspective with the ability to roll back to previous versions efficiently if deployment issues occur.

Once the model deployment of Block 425 is completed, real time monitoring and visualization with Block 430 may begin with a loop back mechanism to the framework (400) to populate the datasets and improve performance of the models. Data in the field at the moment of deployment starts being recorded yet may not be looped back to the framework (400) unless a monitoring step notices inconsistencies whereby a meaningful subset of the data may be fed back to the framework (400) to repeat Blocks 405, 420, and 425.

Upon deploying the latest version of the trained and registered DNN, the DNN model behavior may be modeled in the field (aka production environment) to better understand how the model is performing and to provide visual dashboards and notifications. Insufficient monitoring and feedback looping may result in 1) having erroneous models staying deployed in the field without appropriate supervision, 2) having models whose performance degrade with time or no longer providing value running in the field, 3) having uncaught issues that arise over the lifecycle of the model deployment on the field.

The monitoring and visualization Block 430 of the framework (400) automatically monitors elements. The monitored elements may include a prediction distribution of the deployed model, newly captured input data measurement distributions and discrepancies vs dataset used for training, latency of model, memory and CPU usage, disk utilization, mean and median prediction values, average CH4 background values, real time prediction values to assess true positives from false positives, etc.

The different sets of measurements during monitoring provide useful feedback to the physics-based data generation used at an earlier step of the framework (400) to improve subsequent versions of the DNN models.

The following examples may be provided for by the monitoring and visualization step.
1. Newly captured input data measurements distribution of the deployed model over a few days may differ greatly from the distribution used to train the model. The monitoring system may provide a notification to cue the framework (400) to refresh the model with additional training that may include additional training data that are flagged for a next round of training after being identified in the data processing and management steps.
2. Mean and median prediction values are identified as being different from the mean and median prediction values of the model applied to the test set. A notification may be provided to trigger a feedback loop process to the physics-based data generation for further data capture.
3. False positives may be captured by the model after an assessment of a human operator in the loop. The session where a false positive was identified may be recorded and fed back to the framework (400) for future improvement to retain the model. The end user may use modalities such as infrared cameras and sniffers to validate False positives.

Figure 5:
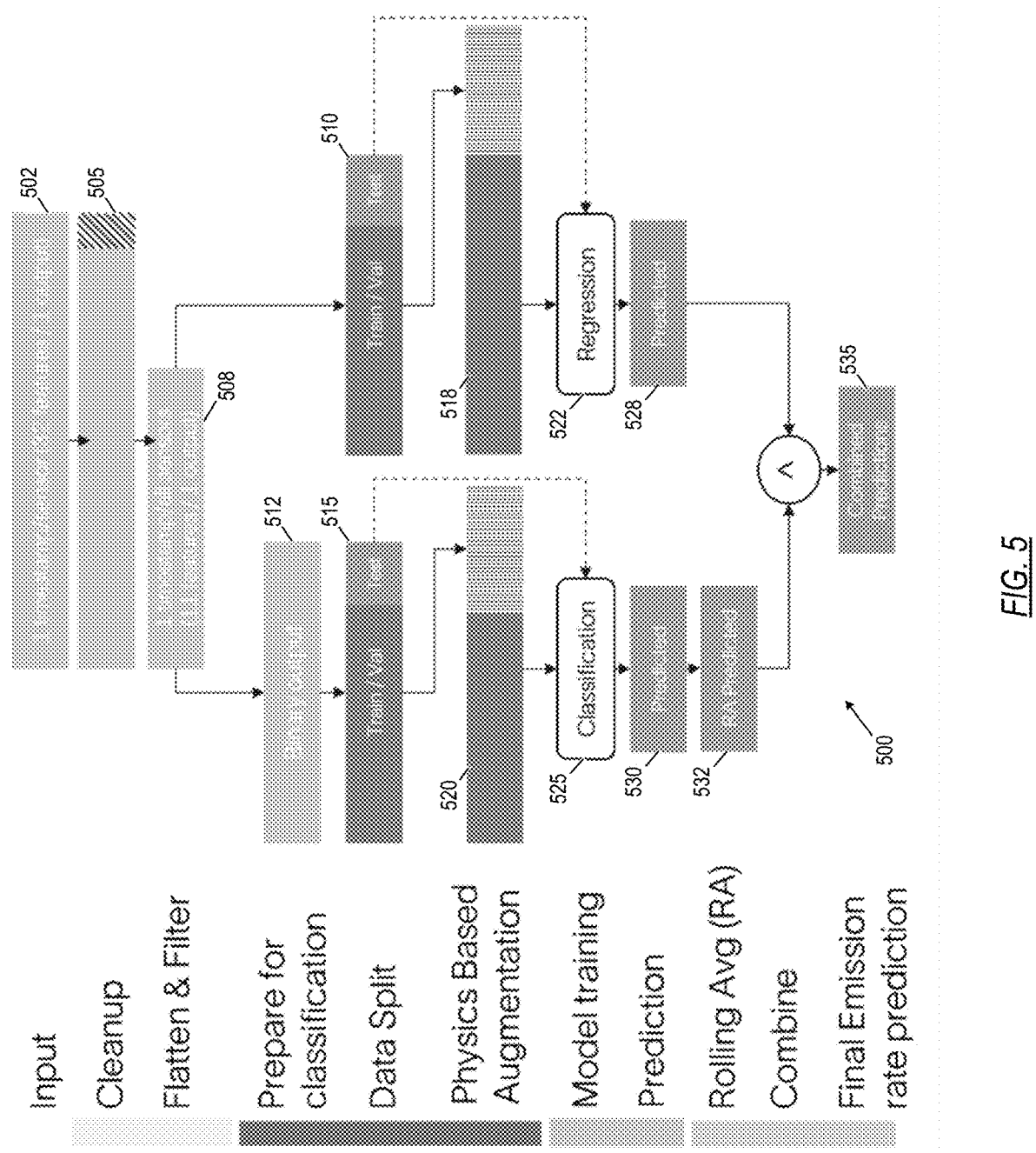

Turning to FIG. 5, in an embodiment, the model training and registry Block 420 of FIG. 4 may utilize an algorithm that combines a classifier model and regressor model and uses the classifier model as a filter on the regressor model output (as opposed to a regression model output without being combined with a classifier output) may be used. In other words, two networks are trained rather than one with the same data and use the filtering power of the classifier model on the regressor output for accurate prediction of methane emission rates.

The input data (502) is received by the system from one or more sensors. The input data (502) may include 32 features and one output for each timestamp recorded by a sensor. The input data is cleaned up (as described above) to generate the cleanup data (505). The cleanup data (505) is flattened and filtered to generate the filter data (508). The filtered data may have 11 features and one output for each time stamp for each sensor of the system.

The filtered data (508) is processed to generate the regression training data (510) and the classification training data (515). Both the regression training data (510) and the classification training data (515) may be split into sets for training, validation, and testing of the machine learning models of the system. The regression training data (510) may be a copy of the filtered data (508).

The classification training data (515) may be different from the regression training data (510). The outputs from the filtered data (508) may be replaced with the binary outputs (512) to form the classification training data (515). The training, validation, and testing sets within the classification training data (515) may correspond to similar sets from the regression training data (510).

The training and validation sets from one or more of the regression training data (510) and the classification training data (515) may be used to generate the regression augmented data (518) and the classification augmented data (520). In an embodiment, the augmented data (518) and (520) is generated by applying a physics-based model to the filtered data (508) to change the values of the features while retaining the values of the outputs.

The regression augmented data (518) and the classification augmented data (520) are used to train the regression model (522) and the classification model (525), respectively. The models are trained by applying the models to the augmented data to generate training predictions that are compared to the outputs from the training data. The air between the trend predictions and the outputs is then used to update the weights, biases, parameters, etc., of the regression model (522) and the classification model (525).

After the regression model (522) and the classification model (525) have been trained, the models may be used for inference to generate the combined predictions (535). The regression model (522) and the classification model (525) may be applied to real-time data from sensors to generate the regression predictions (528) and the classification predictions (530). Groups of the classification predictions are aggregated using a rolling average to form the rolling average predictions (532). The rolling average predictions (532) may be combined with the regression predictions (528) to form the combined predictions (535).

Turning to FIG. 6, two examples (602) and (652) of equivalence of detector locations with respect to the wind direction relative to the source-sensor axis is illustrated. For a particular emission source location, the measurement at an arbitrary point in space for an arbitrary wind is equivalent to a measurement for a point on the x-axis (e.g., East-West axis) for a suitably rotated wind of the same amplitude.

Turning to FIG. 7: a schematic illustration of the concept of the unit dataset is illustrated. Due to equivalence, a dataset for a particular emission source location (702) with detectors (705) placed along a single axis to the source, which may be called a unit dataset. A corresponding dataset may be generated for an arbitrary source location and arbitrary detector location. Generating data for arbitrary source and detector locations enables generating a database for an arbitrary site or facility.

As an example, a unit dataset includes measurements of a pollutant concentration, which may be actual physical measurements or synthetic modeling data of dispersion, at n locations $x_i$ along the positive x-axis, assuming the emission source is set at the origin. The measurements in the unit dataset may include a range of wind speeds and directions, solar intensities, and any other environmental and release rates.

Figure 8:
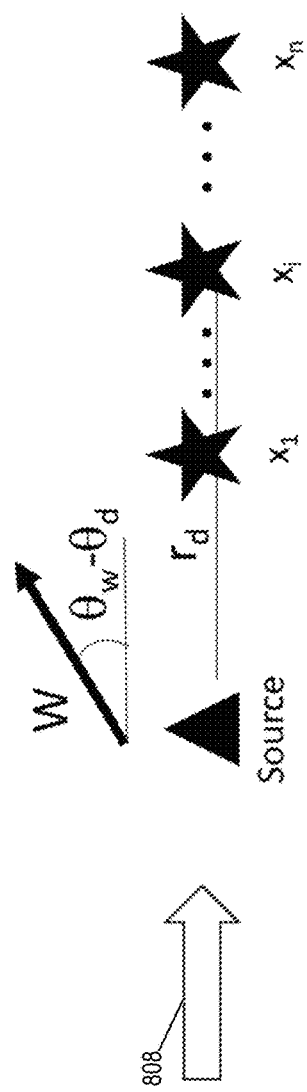
Figure 8:
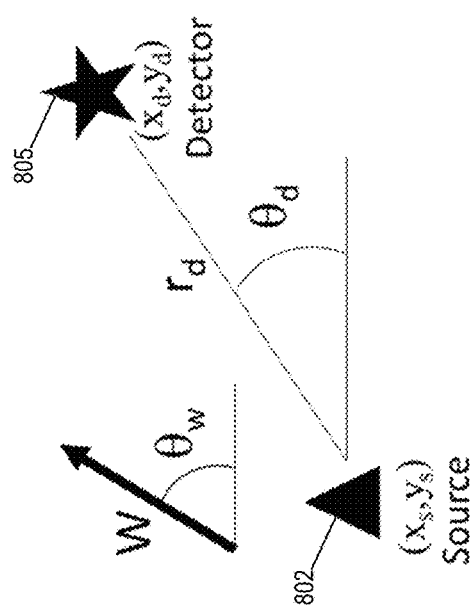

Turning to FIG. 8, a mapping of arbitrary source, detector, and wind onto the unit dataset is illustrated. A unit dataset is used to generate data that corresponds to an emission source (802) at some arbitrary point $(x_s, y_s)$ and detector (805) at location $(x_d, y_d)$, and arbitrary wind with amplitude W and direction $q_w$. Putting the origin at the source location, the detector location is expressed in polar coordinates as $(r_d, q_d)$, with $r_d=\sqrt{(xs-xd)^2+(ys-yd)^2}$ and $q_d=a\tan(|y_s-y_d|, |x_s-x_d|)$. Then the mapping is performed onto the coordinate system of the unit dataset by first translating the origin to the source location of the unit dataset; and second, performing the rotation by the angle $q_d$ such that the detector aligns with the x-axis of the unit dataset. Similarly, the wind is transformed by a similar rotation, keeping the amplitude the same, such that in the unit dataset, the wind of interest corresponds to the wind with amplitude W and direction $q_w-q_d$. Finally, the sensor selects from the unit dataset with the location $x_i$ equal to $r_d$, and uses the concentration measurements from that sensor for the given wind as the corresponding datum for the source-detector configuration of interest.

The mapping (808) is performed for winds that already exist in the unit dataset. The objective is to generate augmented data by mapping the existing dataset, for the conditions actually recorded, rather than by expanding to arbitrary winds. Expanding to arbitrary winds may utilize interpolation, which is not model-free and is the objective for the machine learning model. In that case, no additional interpolation of wind data may be performed at the stage over and above any physics-based data augmentation described below and the methodology outlined here may regenerate the existing dataset for an arbitrary source-detector arrangement.

If $x_i$ from the unit dataset is equal to $r_d$, the portion of the unit dataset transfers directly. Otherwise, some interpolation along the spatial dimension may be employed. One approach is to use the data corresponding to the $x_i$ nearest to $r_d$. If the spacings between the detectors in the unit dataset are small, there is little error introduced. If the spacings are larger, a more sophisticated form of interpolation between $x_i$ and its neighbors may be employed. A direct linear interpolation may be performed of the concentrations measured at $x_i$ and $x_i+1$ or $x_i-1$, for the particular wind and other atmospheric conditions, or some type of fit to the whole line of detectors.

A physics model of dispersion or even elements of computational fluid dynamic (CFD) simulation may aid with the interpolation. The same considerations apply to the heights of the source-sensor pair that are being matched with the unit dataset. If the heights are different, i.e., $z_s$ (the z-axis height of a source) is not the same as the height of any of the sources in the unit dataset, and $z_d$ (the z-axis height of a detector) is not the same as the height of any of the sensors in the unit dataset, some form of interpolation should be applied. In a typical scenario, the sensors may have a standard height above ground that does not vary between installations. These topics are discussed further in the section on the generation of the unit dataset.

To generate the training dataset for the actual detector configuration planned for deployment, the facility plan starts with potential emission sources marked on the plan, either as points or as polygons that may, for example, correspond to equipment groups. If such a marked plan is not available, a uniform grid can be formed with the spacing between grid points corresponding to the desired emission location accuracy. Then, for each potential emission source, whether taken from a grid or from marked locations or the marked polygons (e.g., polygon centroids), a pair is formed with each of the detectors placed at a known location as deployed or planned. For each such pair, the procedure outlined above is followed to transfer the unit dataset, including concentration and meteorological data and the corresponding ground truth release rate, to that pair. Following that process for each of the potential emission sources generates the training data for the complete coverage of the facility. That training data can then be used to build the machine learning model as outlined in the sections below.

Note that an exact match for an arbitrary wind may not be found in the unit dataset. A close match (e.g., within a threshold percentage 1, 2, 10, etc.) may be found in the space of wind speed and direction and any other relevant meteorological parameters such as solar radiation. A number of interpolation techniques may be used to fill in the concentration corresponding to specific weather data. In some embodiments, the sensors may be widely angularly spaced around a perimeter of a facility in such a way so as to minimize the number of sensors used. No two sensors may simultaneously give a reading for any particular wind and solar radiation datum and thus no interpolation may be used when transferring the unit dataset, relying instead on the data augmentation techniques described below.

Figure 9:
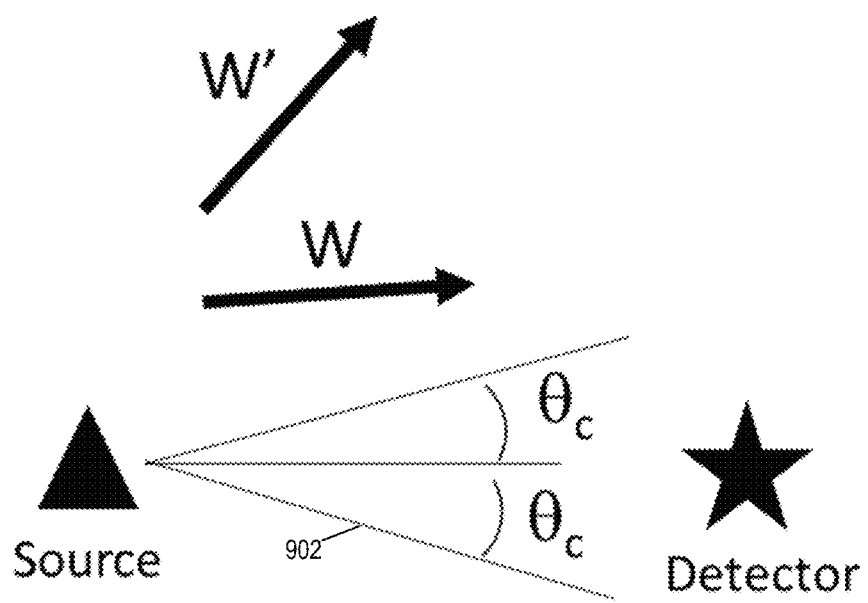

Turning to FIG. 9, the sensitive cone (902) of measurement is illustrated. Winds with wind directions within the cone (902) of $+/-\theta_c=10$ degrees around the source-detector axis, such as wind W in the figure, need to be actually measured in the unit dataset. Winds with wind directions outside the cone, such as wind W' in the figure, need not be measured as we know the detector may read background levels as no pollutant can get from the source to the detector.

Turning to FIG. 10, the columns (1002) and (1005) form a table of data collected from a sensor. Each row of the table is identified by a timestamp. The columns (1002) include columns with values for timestamps, concentration average, concentration standard deviation, solar radiation average, solar radiation standard deviation, windspeed scalar average, and windspeed scalar standard deviation. The columns (1005) include columns with values for windspeed vector average, wind direction vector average, wind direction vector standard deviation, wind direction sine average, wind direction cosine average, x location, y location, and z location.

Turning to FIG. 11, the columns (1102) and (1105) form a table of data collected from a sensor. Each row of the table is identified by a timestamp. The columns (1102) include columns with values for timestamp, concentration average, sensor index, concentration standard deviation, solar radiation average, solar radiation standard deviation, and windspeed scalar average. The columns (1105) include columns with values for windspeed scalar standard deviation, windspeed vector average, wind direction vector average, wind direction vector standard deviation, wind direction sine average, wind direction cosine average, and emission rate.

As described above, the subject of the present disclosure includes a workflow for generating a machine-learning model for predicting the emission rate and emission location based on the input of a time series of multiple point methane concentration measurements as well as meteorological data such as wind speed and direction, solar radiation intensity. A first stage involves generating a unit dataset containing a set of concentration measurements for a wide range of meteorological data. The second stage involves transferring that unit dataset to an arbitrary sensor layout at the site or facility where sensors are (to be) deployed to create the complete training database suitable for that facility. Another stage involves performing supervised learning on the training database to create the predictive model customized for the particular sensor layout.

The first two stages use physics-based data augmentation techniques. Once the system is deployed and starts acquiring data, the database may be continually updated with the new data, going beyond the original training set. Using the new data, the model may be periodically retrained to take that new information into account to be continuously up to date and better customized for a particular site.

Embodiments of the disclosure perform end-to-end methane emission model training and deployment on the cloud or at the edge. Embodiments of the disclosure create the training database for a particular facility and sensor layout. The training database may be created by a direct method whereby a series of test releases of the pollutant at different rates is generated and detected. The concentrations for a range of wind and other meteorological conditions at each of the sensors may be performed. The emission source may be moved to various places and components around the facility and the measurements repeated.

Another embodiment may perform forward modeling of the expected concentrations at the sensor locations based on a computational flow dynamics (CFD) model or a simplified physics-based model such as the Gaussian plume model.

The disclosure further gives a detailed workflow for how to reduce the time and cost of creating that training database by first generating a unit dataset for a particular facility or type of facility with terrain characteristics and then expanding that unit dataset for an arbitrary layout of sensors/detectors to create the customized training dataset for a particular facility and layout. The accelerated database-generation workflow applies equally to actual experimental data and to synthetically generated data based on a physics-based model or CFD.

Specific physics-based data augmentation techniques permitting effective time-efficient construction of the training database. Detailed workflow for using that database to create the machine learning model customized for a particular facility to provide predictions of emission rate based on pollutant concentration measurements in combination with meteorological measurements. The data rebalancing and augmentation strategy of the framework is physics-based and creates new measurements based on existing series of measurements from a field.

For the creation of a successful supervised machine learning (ML) model, the database may cover a wide range of conditions or occurrences expected in the actual application. A limited database may result in poor predictions as extrapolation to cases not present in the training set may not work well. In the case of predicting emissions rate and source location for a particular facility, the ideal training dataset may include each of the sensor measurements given known release location and rate and covering a representative sample of meteorological (e.g., wind and solar) conditions. Such measurement data series may be had for each emission rate and each emission location. Thus, an embodiment of the disclosure may have an extensive testing regimen. The regimen may be at a particular facility for a fixed sensor configuration with a range of pollutant (e.g., methane) releases performed. The releases may be performed from different locations on the facility, based on a grid or based on likelihood of emission (e.g., from various component groups such as tank batteries and compressors), potentially different release heights when applicable, and with a wide range of release rates, covering the full expected range of atmospheric conditions. That dataset may be used to train the machine learning model. Once the training is completed and validated, and based on the field configuration, the model is deployed in the cloud or at the edge. Another strength of the framework is that the framework keeps track of trained and successfully deployed models including the metadata (measured data, number of sensors, features used for training and geographies) to accelerate the training of new models customized to a new sensory configuration in a set location. After the database generation phase, the test releases may be stopped, while the sensors may remain in place and the model generated may then be used to predict actual emission rates and locations on the facility based on concentration measurements. In another embodiment, the database for the particular facility and sensor layout may be created based on modeling, either CFD or some simplified physics-based model such as the GPM, following the same prescription as for actual releases, by moving the virtual release point around and varying the release rate and synthetically computing the expected concentrations at the locations of the sensors. The synthetic data generation approach, depending on desired fidelity, may be significantly faster than direct experimental measurements without having to fully capture the complex behavior of pollutant dispersion in different meteorological conditions.

Figure 12A:
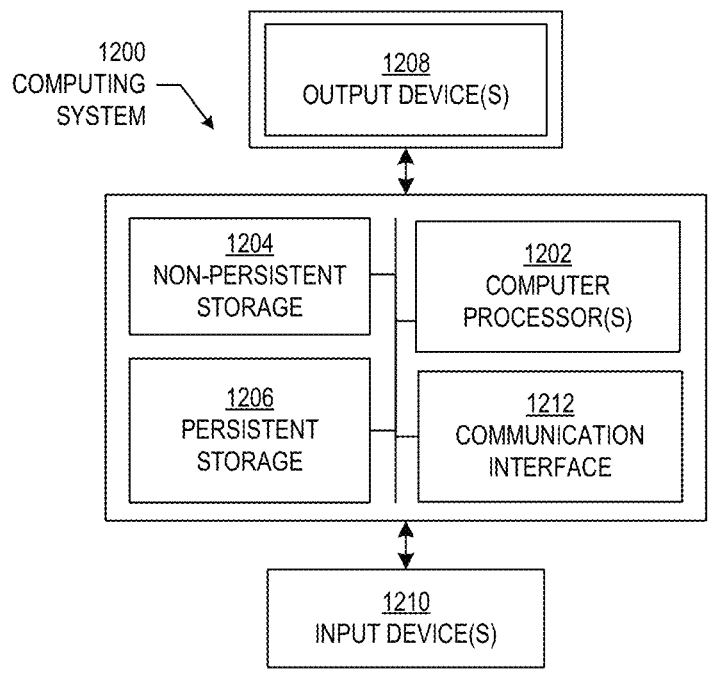
FIG. 12A and FIG. 12B shows a computing system in accordance with one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 12A, the computing system (1200) may include one or more computer processors (1202), non-persistent storage (1204), persistent storage (1206), a communication interface (1212) (e.g., Bluetooth interface, infrared interface, network interface, optical interface, etc.), and numerous other elements and functionalities that implement the features and elements of the disclosure. The computer processor(s) (1202) may be an integrated circuit for processing instructions. The computer processor(s) may be one or more cores or micro-cores of a processor. The computer processor(s) (1202) includes one or more processors. The one or more processors may include a central processing unit (CPU), a graphics processing unit (GPU), a tensor processing unit (TPU), combinations thereof, etc.

The input devices (1210) may include a touchscreen, keyboard, mouse, microphone, touchpad, electronic pen, or any other type of input device. The input devices (1210) may receive inputs from a user that are responsive to data and messages presented by the output devices (1208). The inputs may include text input, audio input, video input, etc., which may be processed and transmitted by the computing system (1200) in accordance with the disclosure. The communication interface (1212) may include an integrated circuit for connecting the computing system (1200) to a network (not shown) (e.g., a local area network (LAN), a wide area network (WAN) such as the Internet, mobile network, or any other type of network) and/or to another device, such as another computing device.

Further, the output devices (1208) may include a display device, a printer, external storage, or any other output device. One or more of the output devices may be the same or different from the input device(s). The input and output device(s) may be locally or remotely connected to the computer processor(s) (1202). Many different types of computing systems exist, and the aforementioned input and output device(s) may take other forms. The output devices (1208) may display data and messages that are transmitted and received by the computing system (1200). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 12B:
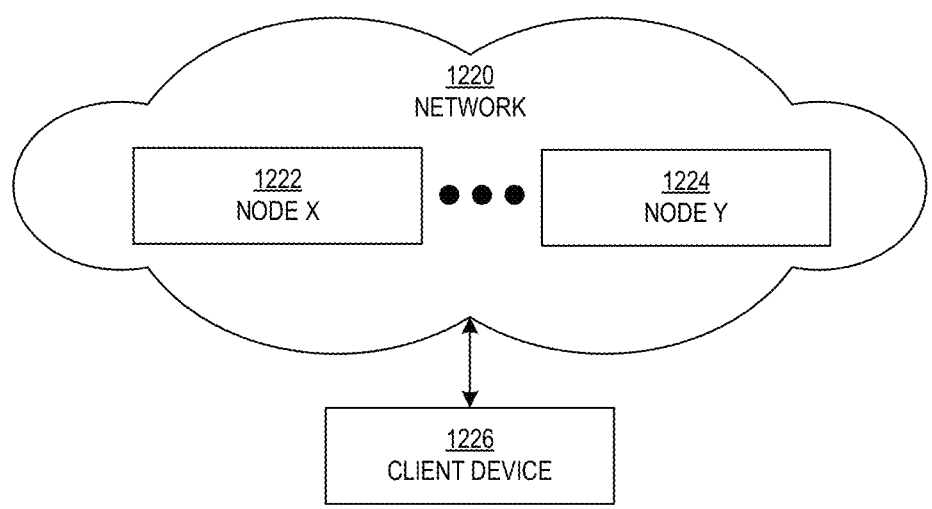

The computing system (1200) in FIG. 12A may be connected to or be a part of a network. For example, as shown in FIG. 12B, the network (1220) may include multiple nodes (e.g., node X (1222), node Y (1224)). Each node may correspond to a computing system, such as the computing system shown in FIG. 12A, or a group of nodes combined may correspond to the computing system shown in FIG. 12A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1200) may be located at a remote location and connected to the other elements over a network.

The nodes (e.g., node X (1222), node Y (1224)) in the network (1220) may be configured to provide services for a client device (1226), including receiving requests and transmitting responses to the client device (1226). For example, the nodes may be part of a cloud computing system. The client device (1226) may be a computing system, such as the computing system shown in FIG. 12A. Further, the client device (1226) may include and/or perform all or a portion of one or more embodiments.

The computing system of FIG. 12A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it may be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    collecting sensor data from a plurality of sensors, comprising:
        creating a training database for a particular facility and a sensor layout by performing operations comprising:
            generating a series of test releases of a pollutant at different rates,
            detecting concentrations for a range of wind and other meteorological conditions at the sensors,
            moving an emission source to various places around a facility, and
            repeating the detecting after moving the emission source;
    applying an augmentation model to the sensor data to form a regression training set, wherein the augmentation model modifies the sensor data to generate synthetic input and applies a physics-based model to the synthetic input to create synthetic output, wherein the synthetic input and the synthetic output are combined to generate the regression training set comprising a plurality of regression output values corresponding to a plurality of input values, wherein the plurality of regression output values comprises the synthetic output and wherein the plurality of input values comprises the synthetic input;
    creating a classification training set for a classification model by applying a threshold to the plurality of regression output values from the regression training set to generate a plurality of classification output values, wherein the plurality of classification output values comprises binary values;
    training a regression model with the regression training set to generate a regression prediction; and
    training the classification model with the classification training set to generate a classification prediction.

2. The method of claim 1, further comprising:
applying the classification model to input data to generate the classification prediction;
applying an aggregation model to the classification prediction to generate an aggregated classification prediction;
applying the regression model to the input data to generate the regression prediction;
applying the aggregated classification prediction to the regression prediction to generate a combined prediction; and
presenting a message with the combined prediction over a computer network.

3. The method of claim 1, wherein the plurality of sensors comprises a sensor that provides a plurality of features and a regression output comprised by the sensor data.

4. The method of claim 1, further comprising:
applying a transformation to raw sensor data to generate the sensor data, the transformation comprising applying a filter to the raw sensor data.

5. The method of claim 1, further comprising:
applying a transformation to raw sensor data to generate the sensor data, the transformation comprising flattening the raw sensor data.

6. The method of claim 1, further comprising:
applying a transformation to raw sensor data to generate the sensor data, the transformation comprising one or more of:
removing an empty row from the raw sensor data, and
removing a number of features from the raw sensor data.

7. The method of claim 1, further comprising:
applying the augmentation model to the sensor data, wherein the augmentation model comprises a computational fluid dynamic (CFD) model.

8. The method of claim 1, further comprising:
applying the augmentation model to the sensor data, wherein the augmentation model comprises a Gaussian plume model (GPM).

9. The method of claim 1, wherein the plurality of sensors provides raw sensor data comprising values for meteorological conditions comprising wind conditions.

10. The method of claim 1, wherein applying the augmentation model to the sensor data comprises:
performing forward modeling of expected concentrations at sensor locations based on one of a computational fluid dynamic model and a Gaussian plume model.

11. The method of claim 1, wherein the classification prediction is part of a set of classification predictions to which an aggregation model is applied, wherein applying the aggregation model comprises applying a rolling average.

12. The method of claim 1, wherein the regression prediction is combined with an aggregated classification prediction by applying the aggregated classification prediction to the regression prediction by multiplying the aggregated classification prediction by the regression prediction to generate a combined prediction.

13. A system comprising:
at least one processor; and
an application that, when executing on the at least one processor, performs:
collecting sensor data from a plurality of sensors, comprising:
creating a training database for a particular facility and a sensor layout by performing operations comprising:
generating a series of test releases of a pollutant at different rates,
detecting concentrations for a range of wind and other meteorological conditions at the sensors, and
repeating the detecting after an emission source is moved to various places around a facility;
applying an augmentation model to the sensor data to form a regression training set, wherein the augmentation model modifies the sensor data to generate synthetic input and applies a physics-based model to the synthetic input to create synthetic output, wherein the synthetic input and the synthetic output are combined to generate the regression training set comprising a plurality of regression output values corresponding to a plurality of input values, wherein the plurality of regression output values comprises the synthetic output and wherein the plurality of input values comprises the synthetic input;
creating a classification training set for a classification model by applying a threshold to the plurality of regression output values from the regression training set to generate a plurality of classification output values, wherein the plurality of classification output values comprises binary values;
training a regression model with the regression training set to generate a regression prediction; and
training the classification model with the classification training set to generate a classification prediction.

14. The system of claim 13, wherein the application further performs:
applying the classification model to input data to generate the classification prediction;
applying an aggregation model to the classification prediction to generate an aggregated classification prediction;
applying the regression model to the input data to generate the regression prediction;
applying the aggregated classification prediction to the regression prediction to generate a combined prediction; and
presenting a message with the combined prediction over a computer network.

15. The system of claim 13, wherein the plurality of sensors comprises a sensor that provides a plurality of features and a regression output comprised by the sensor data.

16. The system of claim 13, wherein the application further performs:
applying a transformation to raw sensor data to generate the sensor data, the transformation comprising applying a filter to the raw sensor data.

17. The system of claim 13, wherein the application further performs:
applying a transformation to raw sensor data to generate the sensor data, the transformation comprising flattening the raw sensor data.

18. The system of claim 13, wherein the application further performs:
applying a transformation to raw sensor data to generate the sensor data, the transformation comprising one or more of:
removing an empty row from the raw sensor data, and
removing a number of features from the raw sensor data.

19. A non-transitory computer readable medium comprising instructions that, when executed by one or more processors, perform:
- collecting sensor data from a plurality of sensors, comprising:
  - creating a training database for a particular facility and a sensor layout by performing operations comprising:
    - generating a series of test releases of a pollutant at different rates,
    - detecting concentrations for a range of wind and other meteorological conditions at the sensors, and
    - repeating the detecting after an emission source is moved to various places around a facility;
- applying an augmentation model to the sensor data to form a regression training set, wherein the augmentation model modifies the sensor data to generate synthetic input and applies a physics-based model to the synthetic input to create synthetic output, wherein the synthetic input and the synthetic output are combined to generate the regression training set comprising a plurality of regression output values corresponding to a plurality of input values, wherein the plurality of regression output values comprises the synthetic output and wherein the plurality of input values comprises the synthetic input;
- creating a classification training set for a classification model by applying a threshold to the plurality of regression output values from the regression training set to generate a plurality of classification output values, wherein the plurality of classification output values comprises binary values;
- training a regression model with the regression training set to generate a regression prediction; and
- training the classification model with the classification training set to generate a classification prediction.

* * * * *